(12) United States Patent
Akkarakaran et al.

(10) Patent No.: US 11,516,839 B2
(45) Date of Patent: Nov. 29, 2022

(54) DISCONTINUOUS SCHEDULING

(71) Applicant: QUALCOMM Incorporated, San Diego, CA (US)

(72) Inventors: Sony Akkarakaran, Poway, CA (US); Tao Luo, San Diego, CA (US); Peter Gaal, San Diego, CA (US); Xiao feng Wang, San Diego, CA (US); Juan Montojo, San Diego, CA (US); Yi Huang, San Diego, CA (US); Renqiu Wang, San Diego, CA (US); Seyong Park, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 23 days.

(21) Appl. No.: 17/328,714

(22) Filed: May 24, 2021

(65) Prior Publication Data

US 2021/0352709 A1 Nov. 11, 2021

Related U.S. Application Data

(63) Continuation of application No. 16/020,915, filed on Jun. 27, 2018, now Pat. No. 11,026,255.

(Continued)

(51) Int. Cl.
*H04W 72/14* (2009.01)
*H04W 72/04* (2009.01)

(52) U.S. Cl.
CPC ....... *H04W 72/14* (2013.01); *H04W 72/0406* (2013.01); *H04W 72/0446* (2013.01); *H04W 72/042* (2013.01)

(58) Field of Classification Search
CPC ............. H04W 72/14; H04W 72/0406; H04W 72/0446; H04W 72/042; H04W 72/1278
See application file for complete search history.

(56) References Cited

U.S. PATENT DOCUMENTS

| 11,026,255 B2 | 6/2021 | Akkarakaran et al. |
| 2014/0010067 A1* | 1/2014 | Guan .................... H04L 1/1887 370/216 |

(Continued)

FOREIGN PATENT DOCUMENTS

WO WO-2016061976 A1 4/2016

OTHER PUBLICATIONS

Taiwan Search Report—TW107122299—TIPO—dated Jul. 29, 2021 (175132TW).

(Continued)

*Primary Examiner* — Yaotang Wang
(74) *Attorney, Agent, or Firm* — Qualcomm Incorporated

(57) ABSTRACT

Methods, systems, and devices for wireless communication are described that support discontinuous scheduling. A base station may transmit, to a user equipment (UE), a grant of resources of a communication channel over a multiple of aggregated TTIs. The UE may monitor a control channel for the grant of resources transmitted by base station. The base station and the UE may identify a location of an excluded TTI within the plurality of aggregated TTIs. The excluded TTI may correspond to a TTI for communicating synchronization signals, random access channel (RACH) signals, or the like. The base station may communicate with the UE via the resources of the communication channel over at least a subset of the aggregated TTIs based on the grant and the location of the excluded TTI.

36 Claims, 23 Drawing Sheets

Related U.S. Application Data

(60) Provisional application No. 62/527,951, filed on Jun. 30, 2017.

(56) References Cited

U.S. PATENT DOCUMENTS

| | | | |
|---|---|---|---|
| 2014/0177487 | A1 | 6/2014 | Hammarwall et al. |
| 2015/0029903 | A1 | 1/2015 | Chen et al. |
| 2015/0305058 | A1 | 10/2015 | Hammarwall et al. |
| 2016/0345355 | A1* | 11/2016 | Andersson ........ H04W 72/0446 |
| 2017/0208616 | A1* | 7/2017 | Panteleev ............. H04W 76/14 |
| 2019/0319770 | A1 | 10/2019 | Wang |

OTHER PUBLICATIONS

Huawei., et al., "Processing Time Reduction and Related Procedures for Short TTI", 3GPP TSG RAN WG1 Meeting #87, 3GPP Draft; R1-1611167, 3rd Generation Partnership Project (3GPP), Mobile Competence Centre, 650, Route Des Lucioles, F-06921 Sophia-Antipolis Cedex, France, vol. RAN WG1, No. Reno, USA; Nov. 5, 2016, 8 Pages, XP051189740, Retrieved from the Internet: URL: http://www.3gpp.org/ftp/tsg_ran/WG1_RL1/TSGR1_87/Docs/ [retrieved on Nov. 5, 2016].

International Search Report and Written Opinion—PCT/US2018/040116—ISA/EPO—dated Oct. 11, 2018.

International Preliminary Report on Patentability—PCT/US2018/040116, The International Bureau of WIPO—Geneva, Switzerland, dated Jan. 9, 2020.

Ipwireless, et al., "On The TDD UL Grant Channel", 3GPP Draft; R1-074933, 3rd Generation Partnership Project (3GPP), Mobile Competence Centre; 650, Route Des Lucioles; F-06921 Sophia-Antipolis Cedex; France, vol. RAN WG1, no. Korea; Oct. 30, 2007, Oct. 30, 2007 (Oct. 30, 2007), 1 Page, XP050108388.

Taiwan Search Report—TW107122299—TIPO—dated Nov. 12, 2021 (175132TW).

\* cited by examiner

DISCONTINUOUS SCHEDULING

CROSS REFERENCES

The present Application for Patent is a Continuation of U.S. patent application Ser. No. 16/020,915 by AKKARAKARAN et al., entitled "DISCONTINUOUS SCHEDULING" filed Jun. 27, 2018, which claims the benefit of U.S. Provisional Patent Application No. 62/527,951 by AKKARAKARAN et al., entitled "DISCONTINUOUS SCHEDULING IN A NEW RADIO SYSTEM," filed Jun. 30, 2017, assigned to the assignee hereof, and expressly incorporated herein.

BACKGROUND

The following relates generally to wireless communication, and more specifically to discontinuous scheduling in, for example, a new radio system.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems, (e.g., a Long Term Evolution (LTE) system, or a New Radio (NR) system). A wireless multiple-access communications system may include a number of base stations or access network nodes, each simultaneously supporting communication for multiple communication devices, which may be otherwise known as user equipment (UE).

A base station in some Long Term Evolution (LTE) or New Radio (NR) deployments may transmit to UEs using different length transmission time intervals (TTIs) that may be reduced in length relative to legacy LTE TTIs. A reduced length TTI may be referred to as a shortened TTI (sTTI) and may support services that provide low latency with high reliability for wireless transmissions. A base station may allocate transmission resources for sTTIs to a UE that may include time and frequency resources. In some cases, reliability may be enhanced through feedback mechanisms that may provide for retransmission of unsuccessfully received transmissions, such as according to hybrid acknowledgment repeat request (HARD) feedback techniques, for example.

New radio (NR) systems provide for slot aggregation in which a base station may grant a UE resources in one or more contiguous slots. In contiguous multi-slot transmission, a grant of resources in a set of aggregated slots may include certain slots that have a special structure, such as a synchronization slot or a random access channel (RACH) slot. Such slots may require or benefit from a different processing approach.

SUMMARY

The described techniques relate to improved methods, systems, devices, or apparatuses that support discontinuous scheduling in, for example, a new radio system. Generally, the described techniques provide for processing a grant of resources within a set of aggregated transmission time intervals (TTIs) to exclude one or more TTIs within the set (e.g., a TTI having a special structure or reserved for another purpose), and for reassignment of a TTI within the set of aggregated TTIs scheduled by a prior grant.

In accordance with the examples described herein, a base station may transmit, to a user equipment (UE), a grant of resources of a communication channel (e.g., a physical uplink shared channel (PUSCH), a physical downlink shared channel (PDSCH), a physical uplink control channel (PUCCH)) over multiple of aggregated TTIs. The UE may monitor a control channel for the grant of resources transmitted by base station. The base station and the UE may identify a location of an excluded TTI within the plurality of aggregated TTIs. The excluded TTI may correspond to a TTI for communicating synchronization signals, RACH signals, or the like. The base station may communicate with the UE via the resources of the communication channel over at least a subset of the aggregated TTIs based on the grant and the location of the excluded TTI.

A method of wireless communication by a UE is described. The method may include monitoring a control channel for a grant of resources of a communication channel over a plurality of aggregated TTIs, identifying a location of an excluded TTI within the plurality of aggregated TTIs, and communicating via the resources of the communication channel over at least a subset of the plurality of aggregated TTIs based at least in part on the grant and the identified location of the excluded TTI.

An apparatus for wireless communication by a UE is described. The apparatus may include means for monitoring a control channel for a grant of resources of a communication channel over a plurality of aggregated TTIs, means for identifying a location of an excluded TTI within the plurality of aggregated TTIs, and means for communicating via the resources of the communication channel over at least a subset of the plurality of aggregated TTIs based at least in part on the grant and the identified location of the excluded TTI.

Another apparatus for wireless communication by a UE is described. The apparatus may include a processor, memory in electronic communication with the processor, and instructions stored in the memory. The instructions may be operable to cause the processor to monitor a control channel for a grant of resources of a communication channel over a plurality of aggregated TTIs, identify a location of an excluded TTI within the plurality of aggregated TTIs, and communicate via the resources of the communication channel over at least a subset of the plurality of aggregated TTIs based at least in part on the grant and the identified location of the excluded TTI.

A non-transitory computer readable medium for wireless communication by a UE is described. The non-transitory computer-readable medium may include instructions operable to cause a processor to monitor a control channel for a grant of resources of a communication channel over a plurality of aggregated TTIs, identify a location of an excluded TTI within the plurality of aggregated TTIs, and communicate via the resources of the communication channel over at least a subset of the plurality of aggregated TTIs based at least in part on the grant and the identified location of the excluded TTI.

Some examples of the method, apparatus, and non-transitory computer-readable medium described above may further include processes, features, means, or instructions for adjusting an end TTI for the plurality of aggregated TTIs based at least in part on the location of the excluded TTI. Some examples of the method, apparatus, and non-transitory computer-readable medium described above may further include processes, features, means, or instructions for adjusting a TTI number for the plurality of aggregated TTIs based at least in part on the location of the excluded TTI.

Some examples of the method, apparatus, and non-transitory computer-readable medium described above may further include processes, features, means, or instructions for maintaining a TTI count of communicated TTIs of the plurality of aggregated TTIs based at least in part on the excluded TTI in the TTI count. Some examples of the method, apparatus, and non-transitory computer-readable medium described above may further include processes, features, means, or instructions for processing a TTI reassignment indication reassigning at least a portion of a first TTI of the plurality of aggregated TTIs.

Some examples of the method, apparatus, and non-transitory computer-readable medium described above may further include processes, features, means, or instructions for communicating an acknowledgment of the TTI reassignment indication prior to a beginning TTI of the plurality of aggregated TTIs. Some examples of the method, apparatus, and non-transitory computer-readable medium described above may further include processes, features, means, or instructions for determining that the at least the portion of the first TTI may be being punctured. Some examples of the method, apparatus, and non-transitory computer-readable medium described above may further include processes, features, means, or instructions for adjusting TTIs included in the plurality of aggregated TTIs based at least in part on the TTI reassignment indication.

In some examples of the method, apparatus, and non-transitory computer-readable medium described above, adjusting the TTIs comprises: determining a location of the first TTI within the plurality of aggregated TTIs. Some examples of the method, apparatus, and non-transitory computer-readable medium described above may further include processes, features, means, or instructions for shifting a subset of the plurality of aggregated TTIs, that occurs after the first TTI, back by at least one TTI based at least in part on the determined location.

In some examples of the method, apparatus, and non-transitory computer-readable medium described above, communicating via the resources of the communication channel comprises: identifying a first plurality of symbols of the first TTI associated with a synchronization signal to be transmitted via a first transmit beam and a second plurality of symbols of the first TTI to be transmitted via a second transmit beam. Some examples of the method, apparatus, and non-transitory computer-readable medium described above may further include processes, features, means, or instructions for receiving a first portion of a data transmission of the first TTI in the first plurality of symbols via a first receive beam associated with the first transmit beam and a second portion of the data transmission of the first TTI in the second plurality of symbols via a second receive beam associated with the second transmit beam.

Some examples of the method, apparatus, and non-transitory computer-readable medium described above may further include processes, features, means, or instructions for determining that a location of an acknowledgment TTI may have been changed to an updated location based at least in part on adjusting the TTIs included in the plurality of aggregated TTIs. Some examples of the method, apparatus, and non-transitory computer-readable medium described above may further include processes, features, means, or instructions for communicating a merged feedback message that includes channel state information (CSI) and acknowledgement data within the updated location.

In some examples of the method, apparatus, and non-transitory computer-readable medium described above, determining that the location of the acknowledgment TTI may have changed comprises: determining that the updated location of the acknowledgment TTI may be in a same TTI as a TTI scheduled to transport the CSI. In some examples of the method, apparatus, and non-transitory computer-readable medium described above, determining that the location of the acknowledgment TTI may have changed comprises: determining that the CSI may be scheduled to be transmitted within one of the adjusted plurality of aggregated TTIs.

Some examples of the method, apparatus, and non-transitory computer-readable medium described above may further include processes, features, means, or instructions for determining that the TTI reassignment indication may be received after a beginning of a multi-TTI acknowledgment transmission. Some examples of the method, apparatus, and non-transitory computer-readable medium described above may further include processes, features, means, or instructions for cancelling a remainder of the multi-TTI acknowledgment transmission.

Some examples of the method, apparatus, and non-transitory computer-readable medium described above may further include processes, features, means, or instructions for determining that the TTI reassignment indication may be received after a beginning of transmission of a multi-TTI acknowledgment transmission, wherein the merged feedback message comprises at least a portion of the multi-TTI acknowledgment transmission.

Some examples of the method, apparatus, and non-transitory computer-readable medium described above may further include processes, features, means, or instructions for determining that a location of an acknowledgment TTI may have changed to an updated location that overlaps with a TTI in which CSI may be scheduled for transmission. Some examples of the method, apparatus, and non-transitory computer-readable medium described above may further include processes, features, means, or instructions for determining that the TTI reassignment indication may be received after a beginning of transmission of a multi-TTI acknowledgment transmission. Some examples of the method, apparatus, and non-transitory computer-readable medium described above may further include processes, features, means, or instructions for transmitting the CSI and at least a portion of the multi-TTI acknowledgment transmission within the updated location of the acknowledgment TTI.

In some examples of the method, apparatus, and non-transitory computer-readable medium described above, the grant comprises a bit sequence identifying the plurality of aggregated TTIs. In some examples of the method, apparatus, and non-transitory computer-readable medium described above, the grant comprises an index that corresponds to one of a plurality of configurations for the plurality of aggregated TTIs. In some examples of the method, apparatus, and non-transitory computer-readable medium described above, at least some of the plurality of aggregated TTIs may be non-contiguous in time.

A method of wireless communication by a base station is described. The method may include transmitting, to a UE, a grant of resources of a communication channel over a plurality of aggregated TTIs, identifying a location of an excluded TTI within the plurality of aggregated TTIs, and communicating with the UE via the resources of the communication channel over at least a subset of the plurality of aggregated TTIs based at least in part on the grant and the location of the excluded TTI.

An apparatus for wireless communication by a base station is described. The apparatus may include means for transmitting, to a UE, a grant of resources of a communication channel over a plurality of aggregated TTIs, means for identifying a location of an excluded TTI within the plurality of aggregated TTIs, and means for communicating with the UE via the resources of the communication channel over at least a subset of the plurality of aggregated TTIs based at least in part on the grant and the location of the excluded TTI.

Another apparatus for wireless communication by a base station is described. The apparatus may include a processor, memory in electronic communication with the processor, and instructions stored in the memory. The instructions may be operable to cause the processor to transmit, to a UE, a grant of resources of a communication channel over a plurality of aggregated TTIs, identify a location of an excluded TTI within the plurality of aggregated TTIs, and communicate with the UE via the resources of the communication channel over at least a subset of the plurality of aggregated TTIs based at least in part on the grant and the location of the excluded TTI.

A non-transitory computer readable medium for wireless communication by a base station is described. The non-transitory computer-readable medium may include instructions operable to cause a processor to transmit, to a UE, a grant of resources of a communication channel over a plurality of aggregated TTIs, identify a location of an excluded TTI within the plurality of aggregated TTIs, and communicate with the UE via the resources of the communication channel over at least a subset of the plurality of aggregated TTIs based at least in part on the grant and the location of the excluded TTI.

Some examples of the method, apparatus, and non-transitory computer-readable medium described above may further include processes, features, means, or instructions for adjusting an end TTI for the plurality of aggregated TTIs based at least in part on the location of the excluded TTI. Some examples of the method, apparatus, and non-transitory computer-readable medium described above may further include processes, features, means, or instructions for adjusting a TTI number for the plurality of aggregated TTIs based at least in part on the location of the excluded TTI.

Some examples of the method, apparatus, and non-transitory computer-readable medium described above may further include processes, features, means, or instructions for generating a TTI reassignment indication reassigning at least a portion of a first TTI of the plurality of aggregated TTIs. Some examples of the method, apparatus, and non-transitory computer-readable medium described above may further include processes, features, means, or instructions for adjusting TTIs included in the plurality of aggregated TTIs based at least in part on the TTI reassignment indication.

In some examples of the method, apparatus, and non-transitory computer-readable medium described above, adjusting the TTIs comprises: determining a location of the first TTI within the plurality of aggregated TTIs. Some examples of the method, apparatus, and non-transitory computer-readable medium described above may further include processes, features, means, or instructions for shifting a subset of the plurality of aggregated TTIs, that occurs after the first TTI, back by at least one TTI based at least in part on the determined location.

Some examples of the method, apparatus, and non-transitory computer-readable medium described above may further include processes, features, means, or instructions for identifying a first plurality of symbols of the first TTI associated with a synchronization signal to be transmitted via a first transmit beam and a second plurality of symbols of the first TTI to be transmitted via a second transmit beam. Some examples of the method, apparatus, and non-transitory computer-readable medium described above may further include processes, features, means, or instructions for transmitting a first portion of a data transmission of the first TTI in the first plurality of symbols via the first transmit beam and a second portion of the data transmission of the first TTI in the second plurality of symbols via the second transmit beam.

Some examples of the method, apparatus, and non-transitory computer-readable medium described above may further include processes, features, means, or instructions for communicating a merged feedback message that includes channel state information (CSI) and acknowledgement data. In some examples of the method, apparatus, and non-transitory computer-readable medium described above, generating the TTI reassignment indication comprises: generating the TTI reassignment indication based at least in part on determining that a capability of the UE satisfies a threshold. Some examples of the method, apparatus, and non-transitory computer-readable medium described above may further include processes, features, means, or instructions for transmitting the TTI reassignment indication to the UE.

In some examples of the method, apparatus, and non-transitory computer-readable medium described above, determining that the capability of the UE satisfies the threshold comprises: determining that a response time of the UE satisfies the threshold. Some examples of the method, apparatus, and non-transitory computer-readable medium described above may further include processes, features, means, or instructions for receiving an acknowledgment of the TTI reassignment indication prior to a beginning TTI of the plurality of aggregated TTIs.

Some examples of the method, apparatus, and non-transitory computer-readable medium described above may further include processes, features, means, or instructions for communicating a transport block size that excludes the first TTI from a calculation of the transport block size. Some examples of the method, apparatus, and non-transitory computer-readable medium described above may further include processes, features, means, or instructions for determining that the at least the portion of the first TTI may be being punctured.

In some examples of the method, apparatus, and non-transitory computer-readable medium described above, the grant comprises a bit sequence identifying the plurality of aggregated TTIs. In some examples of the method, apparatus, and non-transitory computer-readable medium described above, the grant comprises an index that corresponds to one of a plurality of configurations for the plurality of aggregated TTIs. In some examples of the method, apparatus, and non-transitory computer-readable medium described above, at least some of the plurality of aggregated TTIs may be non-contiguous in time.

DETAILED DESCRIPTION

The described techniques relate to improved methods, systems, devices, or apparatuses that support discontinuous scheduling. Generally, the described techniques provide for processing a grant of resources within a set of aggregated transmission time intervals (TTIs), and for reassignment of a TTI scheduled by a prior grant.

New radio (NR) systems provide for slot aggregation in which a base station may grant a user equipment (UE) resources in one or more slots. In some cases, an encoded packet may be modulated onto resource blocks in multiple slots, or a one-slot transmission may be repeated in multiple slots. In contiguous multi-slot transmission, a grant of resources in a set of aggregated slots may include certain slots that have a special structure. Slots having a special structure may include, for example, slots containing a synchronization channel on the downlink (e.g., a sync slot) and a random access channel on the uplink (e.g., a RACH slot). Slots having a special structure may not be available for data communication. Thus, such slots may need to be excluded from the set of aggregated slots. Conventional NR systems lack techniques for indicating or identifying which slots are to be excluded from the set of aggregated slots.

Moreover, a slot that may be included in a set of aggregated slots in an initial grant may subsequently be identified as a slot having a special structure. Such slots may include slots reserved for forward compatibility (e.g., slots reserved for transmissions that are only allowed for future releases), slots containing Ultra-Reliable and Low-Latency Communications (URLLC) data, or the like. Conventional NR systems lack techniques for indicating or identifying, after an initial grant, which slots are to be excluded from the previously granted set of aggregated slots.

In accordance with the examples described herein, a base station may transmit, to a UE, a grant of resources of a communication channel over multiple aggregated TTIs. The UE may monitor a control channel for the grant of resources transmitted by base station. The base station and the UE may identify a location of an excluded TTI within the plurality of aggregated TTIs. The excluded TTI may correspond to a TTI for communicating synchronization signals, RACH signals, or the like. The base station may communicate with the UE via the resources of the communication channel over at least a subset of the aggregated TTIs based on the grant and the location of the excluded TTI.

Aspects of the disclosure are initially described in the context of a wireless communications system. The wireless communications system may provide for processing a grant of resources within a set of aggregated TTIs, and for reassignment of a TTI scheduled by a prior grant. Aspects of the disclosure are further illustrated by and described with reference to apparatus diagrams, system diagrams, and flowcharts that relate to discontinuous scheduling.

Figure 1:
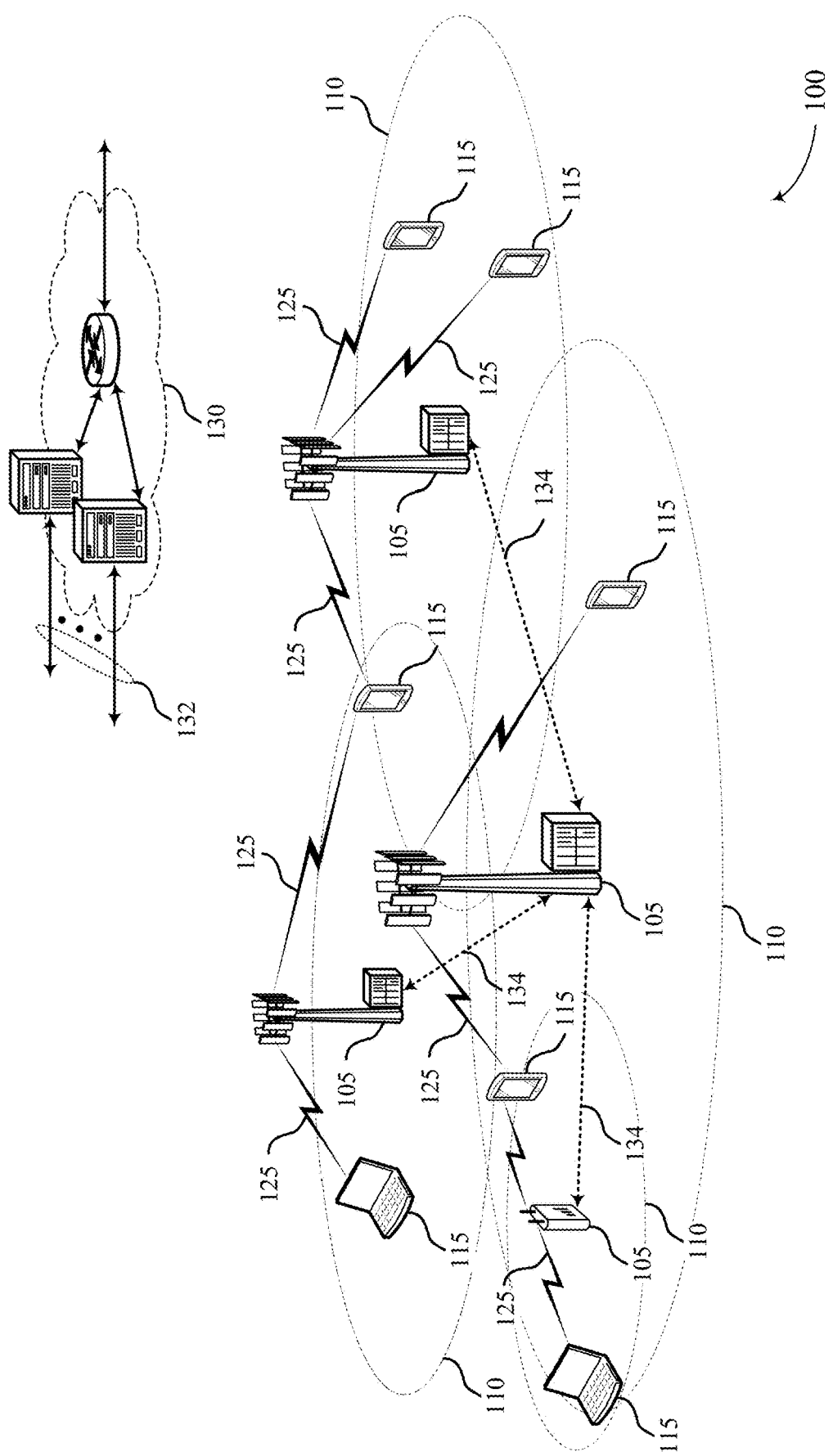
FIG. 1 illustrates an example of a system for wireless communication that supports discontinuous scheduling in accordance with aspects of the present disclosure.

FIG. 1 illustrates an example of a wireless communications system 100 in accordance with various aspects of the present disclosure. The wireless communications system 100 includes base stations 105, UEs 115, and a core network 130. In some examples, the wireless communications system 100 may be a Long Term Evolution (LTE), LTE-Advanced (LTE-A) network, or a New Radio (NR) network. In some cases, wireless communications system 100 may support enhanced broadband communications, ultra-reliable (i.e., mission critical) communications, low latency communications, and communications with low-cost and low-complexity devices.

In accordance with the examples described herein, a base station 105 may transmit, to a UE 115, a grant of resources of a communication channel over multiple of aggregated TTIs. The grant of resources may be used for uplink transmission, downlink transmission, or both, within the resources of the communication channel over the multiple aggregated TTIs. The UE 115 may monitor a control channel for the grant of resources transmitted by base station 105. The base station 105 and the UE 115 may identify a location of an excluded TTI within the aggregated TTIs. The excluded TTI may correspond to a TTI for communicating synchronization signals, RACH signals, or the like. The base station 105 may communicate with the UE 115 via the communication channel resources over at least a subset of the aggregated TTIs based on the grant and the location of the excluded TTI.

Base stations 105 may wirelessly communicate with UEs 115 via one or more base station antennas. Each base station 105 may provide communication coverage for a respective geographic coverage area 110. Communication links 125 shown in wireless communications system 100 may include uplink transmissions from a UE 115 to a base station 105, or downlink transmissions, from a base station 105 to a UE 115. Control information and data may be multiplexed on an uplink channel or downlink according to various techniques.

Control information and data may be multiplexed on a downlink channel, for example, using time division multiplexing (TDM) techniques, frequency division multiplexing (FDM) techniques, or hybrid TDM-FDM techniques. In some examples, the control information transmitted during a transmission time interval (TTI) of a downlink channel may be distributed between different control regions in a cascaded manner (e.g., between a common control region and one or more UE-specific control regions).

UEs 115 may be dispersed throughout the wireless communications system 100, and each UE 115 may be stationary or mobile. A UE 115 may also be referred to as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may also be a cellular phone, a personal digital assistant (PDA), a wireless modem, a wireless communication device, a handheld device, a tablet computer, a laptop computer, a cordless phone, a personal electronic device, a handheld device, a personal computer, a wireless local loop (WLL) station, an Internet of Things (IoT) device, an Internet of Everything (IoE) device, a machine type communication (MTC) device, an appliance, an automobile, or the like.

In some cases, a UE 115 may also be able to communicate directly with other UEs (e.g., using a peer-to-peer (P2P) or device-to-device (D2D) protocol). One or more of a group of UEs 115 utilizing D2D communications may be within the coverage area 110 of a cell. Other UEs 115 in such a group may be outside the coverage area 110 of a cell, or otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out independent of a base station 105.

Some UEs 115, such as MTC or IoT devices, may be low cost or low complexity devices, and may provide for automated communication between machines, i.e., Machine-to-Machine (M2M) communication. M2M or MTC may refer to data communication technologies that allow devices to communicate with one another or a base station without human intervention. For example, M2M or MTC may refer to communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

In some cases, an MTC device may operate using half-duplex (one-way) communications at a reduced peak rate. MTC devices may also be configured to enter a power saving "deep sleep" mode when not engaging in active communications. In some cases, MTC or IoT devices may be designed to support mission critical functions and wireless communications system may be configured to provide ultra-reliable communications for these functions.

Base stations 105 may communicate with the core network 130 and with one another. For example, base stations 105 may interface with the core network 130 through backhaul links 132 (e.g., S1, etc.). Base stations 105 may communicate with one another over backhaul links 134 (e.g., X2, etc.) either directly or indirectly (e.g., through core network 130). Base stations 105 may perform radio configuration and scheduling for communication with UEs 115, or may operate under the control of a base station controller (not shown). In some examples, base stations 105 may be macro cells, small cells, hot spots, or the like. Base stations 105 may also be referred to as evolved NodeBs (eNBs) 105.

A base station 105 may be connected by an S1 interface to the core network 130. The core network may be an evolved packet core (EPC), which may include at least one mobility management entity (MME), at least one serving gateway (S-GW), and at least one Packet Data Network (PDN) gateway (P-GW). The MME may be the control node that processes the signaling between the UE 115 and the EPC. All user Internet Protocol (IP) packets may be transferred through the S-GW, which itself may be connected to the P-GW. The P-GW may provide IP address allocation as well as other functions. The P-GW may be connected to the network operators IP services. The operators IP services may include the Internet, the Intranet, an IP Multimedia Subsystem (IMS), and a Packet-Switched (PS) Streaming Service.

The core network 130 may provide user authentication, access authorization, tracking, Internet Protocol (IP) connectivity, and other access, routing, or mobility functions. At least some of the network devices, such as base station 105 may include subcomponents such as an access network entity, which may be an example of an access node controller (ANC). Each access network entity may communicate with a number of UEs 115 through a number of other access network transmission entities, each of which may be an example of a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate in an ultra-high frequency (UHF) frequency region using frequency bands from 700 MHz to 2600 MHz (2.6 GHz), although some networks (e.g., a wireless local area network (WLAN)) may use frequencies as high as 4 GHz. This region may also be known as the decimeter band, since the wavelengths range from approximately one decimeter to one meter in length. UHF waves may propagate mainly by line of sight, and may be blocked by buildings and environmental features. However, the waves may penetrate walls sufficiently to provide service to UEs 115 located indoors. Transmission of UHF waves is characterized by smaller antennas and shorter range (e.g., less than 100 km) compared to transmission using the smaller frequencies (and longer waves) of the high frequency (HF) or very high frequency (VHF) portion of the spectrum. In some cases, wireless communications system 100 may also utilize extremely high frequency (EHF) portions of the spectrum (e.g., from 30 GHz to 300 GHz). This region may also be known as the millimeter band, since the wavelengths range from approximately one millimeter to one centimeter in length. Thus, EHF antennas may be even smaller and more closely spaced than UHF antennas. In some cases, this may facilitate use of antenna arrays within a UE 115 (e.g., for directional beamforming). However, EHF transmissions may be subject to even greater atmospheric attenuation and shorter range than UHF transmissions.

Thus, wireless communications system 100 may support millimeter wave (mmW) communications between UEs 115 and base stations 105. Devices operating in mmW or EHF bands may have multiple antennas to allow beamforming. That is, a base station 105 may use multiple antennas or antenna arrays to conduct beamforming operations for directional communications with a UE 115. Beamforming (which may also be referred to as spatial filtering or directional transmission) is a signal processing technique that may be used at a transmitter (e.g., a base station 105) to shape and/or steer an overall antenna beam in the direction of a target receiver (e.g., a UE 115). This may be achieved by combining elements in an antenna array in such a way that transmitted signals at particular angles experience constructive interference while others experience destructive interference.

Multiple-input multiple-output (MIMO) wireless systems use a transmission scheme between a transmitter (e.g., a base station 105) and a receiver (e.g., a UE 115), where both transmitter and receiver are equipped with multiple antennas. Some portions of wireless communications system 100 may use beamforming. For example, base station 105 may have an antenna array with a number of rows and columns of antenna ports that the base station 105 may use for beamforming in its communication with UE 115. Signals may be transmitted multiple times in different directions (e.g., each transmission may be beamformed differently). A mmW receiver (e.g., a UE 115) may try multiple beams (e.g., antenna subarrays) while receiving the synchronization signals.

In some cases, the antennas of a base station 105 or UE 115 may be located within one or more antenna arrays, which may support beamforming or MIMO operation. One or more base station antennas or antenna arrays may be collocated at an antenna assembly, such as an antenna tower. In some cases, antennas or antenna arrays associated with a base station 105 may be located in diverse geographic locations. A base station 105 may multiple use antennas or antenna arrays to conduct beamforming operations for directional communications with a UE 115.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use Hybrid ARQ (HARD) to provide retransmission at the MAC layer to improve link efficiency. In the control plane, the Radio Resource Control (RRC) protocol layer may provide establishment, configuration, and maintenance of an RRC connection between a UE 115 and a network device, base station 105, or core network 130 supporting radio bearers for user plane data. At the Physical (PHY) layer, transport channels may be mapped to physical channels.

Time intervals in LTE or NR may be expressed in multiples of a basic time unit (which may be a sampling period of $T_s=1/30,720,000$ seconds). Time resources may be organized according to radio frames of length of 10 ms ($T_f=307200\ T_s$), which may be identified by a system frame number (SFN) ranging from 0 to 1023. Each frame may include ten 1 ms subframes numbered from 0 to 9. A subframe may be further divided into two 0.5 ms slots, each of which contains 6 or 7 modulation symbol periods (depending on the length of the cyclic prefix prepended to each symbol). Excluding the cyclic prefix, each symbol contains 2048 sample periods. In some cases the subframe may be the smallest scheduling unit, also known as a TTI. In other cases, a TTI may be shorter than a subframe or may be dynamically selected (e.g., in short TTI bursts or in selected component carriers using short TTIs, for example, slots or mini-slots).

A resource element may include one symbol period and one subcarrier (e.g., a 15 KHz frequency range). A resource block may contain 12 consecutive subcarriers in the frequency domain and, for a normal cyclic prefix in each OFDM symbol, 7 consecutive OFDM symbols in the time domain (1 slot), or 84 resource elements. The number of bits carried by each resource element may depend on the modulation scheme (the configuration of symbols that may be selected during each symbol period). Thus, the more resource blocks that a UE receives and the higher the modulation scheme, the higher the data rate may be.

Wireless communications system 100 may support operation on multiple cells or carriers, a feature which may be referred to as carrier aggregation (CA) or multi-carrier operation. A carrier may also be referred to as a component carrier (CC), a layer, a channel, etc. The terms "carrier," "component carrier," "cell," and "channel" may be used interchangeably herein. A UE 115 may be configured with multiple downlink CCs and one or more uplink CCs for carrier aggregation. Carrier aggregation may be used with both FDD and TDD component carriers.

In some cases, wireless communications system 100 may utilize enhanced component carriers (eCCs). An eCC may be characterized by one or more features including: wider bandwidth, shorter symbol duration, shorter TTIs, and modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (where more than one operator is allowed to use the spectrum). An eCC characterized by wide bandwidth may include one or more segments that may be utilized by UEs 115 that are not capable of monitoring the whole bandwidth or prefer to use a limited bandwidth (e.g., to conserve power).

In some cases, an eCC may utilize a different symbol duration than other CCs, which may include use of a reduced symbol duration as compared with symbol durations of the other CCs. A shorter symbol duration is associated with increased subcarrier spacing. A device, such as a UE 115 or base station 105, utilizing eCCs may transmit wideband signals (e.g., 20, 40, 60, 80 MHz, etc.) at reduced symbol durations (e.g., 16.67 microseconds). A TTI in eCC may include one or multiple symbols. In some cases, the TTI duration (that is, the number of symbols in a TTI) may be variable.

A shared radio frequency spectrum band may be utilized in an NR shared spectrum system. For example, an NR shared spectrum may utilize any combination of licensed, shared, and unlicensed spectrums, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across frequency) and horizontal (e.g., across time) sharing of resources.

In some cases, wireless system 100 may utilize both licensed and unlicensed radio frequency spectrum bands. For example, wireless system 100 may employ LTE License Assisted Access (LTE-LAA) or LTE Unlicensed (LTE U) radio access technology or NR technology in an unlicensed band such as the 5 GHz Industrial, Scientific, and Medical (ISM) band. When operating in unlicensed radio frequency spectrum bands, wireless devices such as base stations 105 and UEs 115 may employ listen-before-talk (LBT) procedures to ensure the channel is clear before transmitting data. In some cases, operations in unlicensed bands may be based on a CA configuration in conjunction with CCs operating in a licensed band. Operations in unlicensed spectrum may include downlink transmissions, uplink transmissions, or both. Duplexing in unlicensed spectrum may be based on frequency division duplexing (FDD), time division duplexing (TDD) or a combination of both.

New radio (NR) systems provide for slot-aggregation in which a base station may grant a UE resources in one or more slots. Conventional NR systems lack techniques for handling slots having a special structure that fall within the set of aggregated slots. The described techniques provide for processing a grant of resources within a set of aggregated TTIs, and for reassignment of a TTI scheduled by a prior grant.

Figure 2:
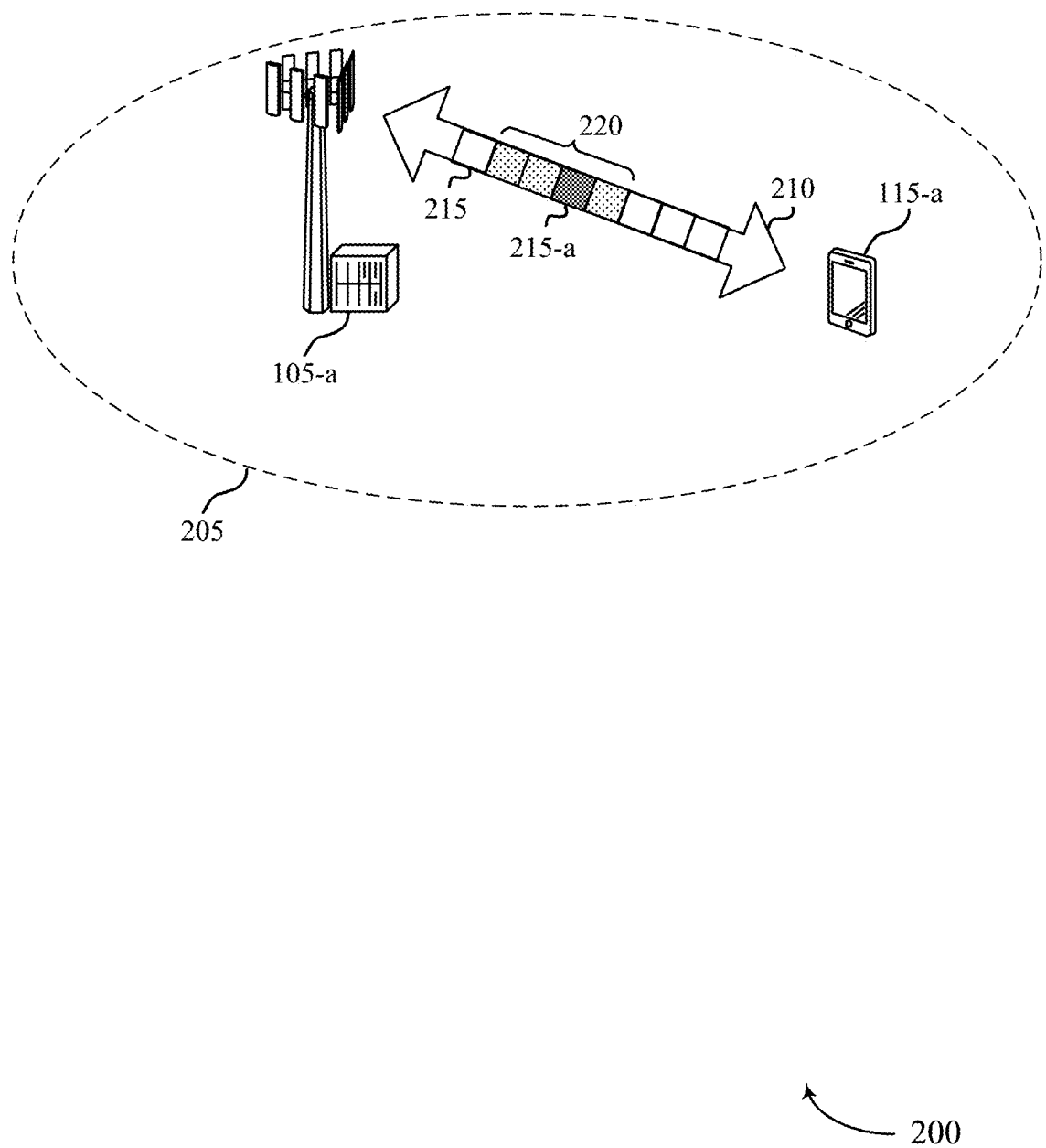
FIG. 2 illustrates an example diagram of a wireless communications system that supports discontinuous scheduling in accordance with aspects of the present disclosure.

FIG. 2 illustrates an example diagram of a wireless communications system 200 that supports discontinuous scheduling in accordance with various aspects of the present disclosure. In some examples, wireless communications system 200 may implement aspects of wireless communication system 100. Wireless communications system 200 may include a base station 105-a and a UE 115-a, which may be examples of the corresponding devices described with reference to FIG. 1.

In some examples, base station 105-a may communicate with one or more UEs 115 within geographic coverage area 205. For example, base station 105-a may be in communication with UE 115-a via bidirectional communication link 210. In some examples, time and frequency resources may include a bandwidth that is divided into transmission time intervals (TTIs) 215 in which the base station 105-a and UE 115-a may communicate. In some examples, a base station 105-a may provide a grant of resources within a set of aggregated TTIs 220 to a UE 115-a, and the base station 105-a and the UE 115-a may use the resources for communication of uplink and/or downlink data. The set of aggregated TTIs 220 may include an excluded TTI 215-a that is not part of the grant of resources, and the base station 105-a and the UE 115-a may account for the excluded TTI 215-a when communicating.

Figure 3:
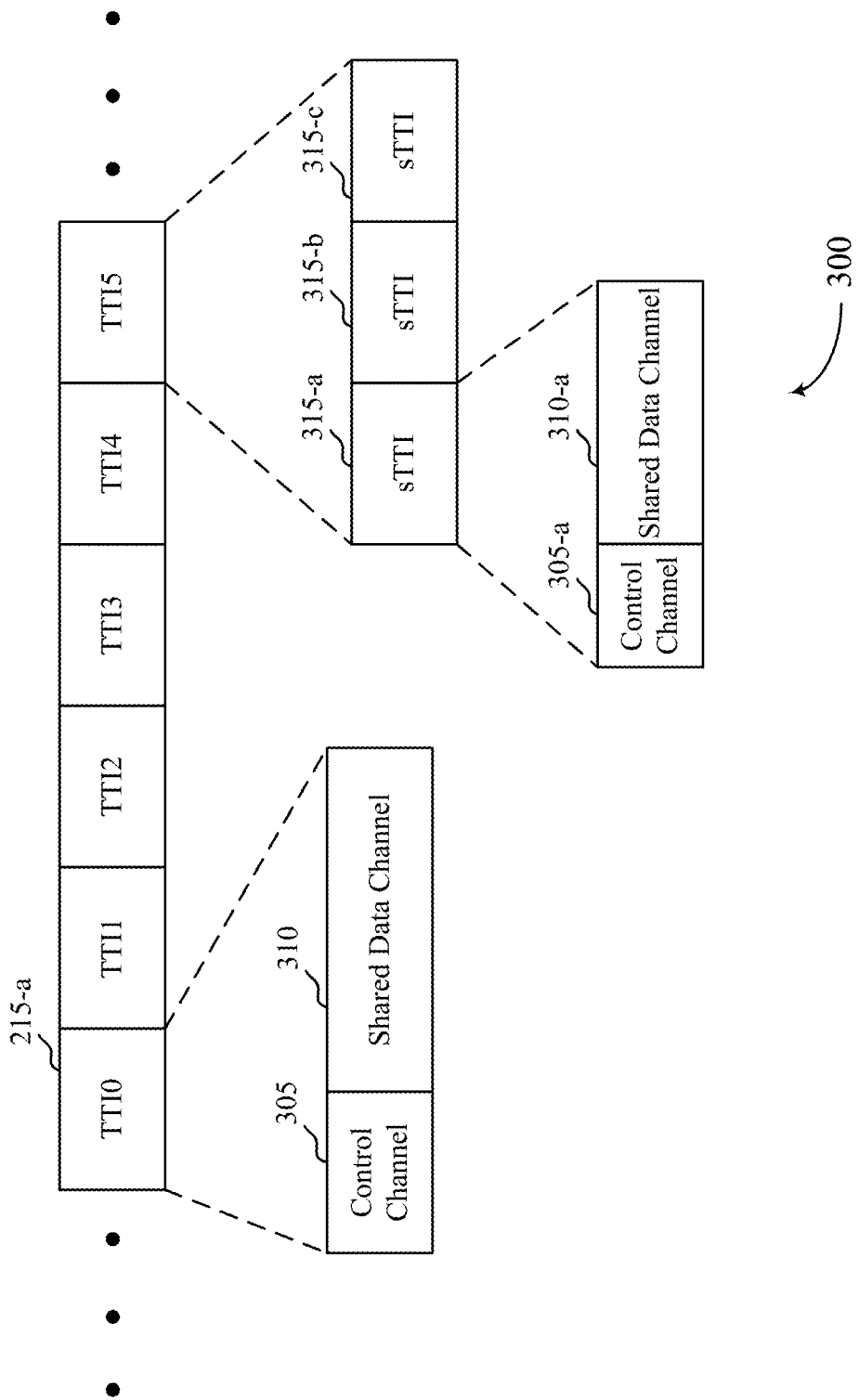
FIG. 3 illustrates an example diagram of transmission time intervals (TTIs) that support discontinuous scheduling in accordance with aspects of the present disclosure.

FIG. 3 illustrates an example diagram 300 of TTIs that supports discontinuous scheduling in accordance with various aspects of the present disclosure. As noted above, time and frequency resources may include a bandwidth that may be divided into TTIs 215-a in which the base station 105-a and UE 115-a may communicate. The TTIs 215-a may represent time durations that may be of a fixed length within the bandwidth. A TTI may include a control channel 305 and a shared data channel 310. The control channel 305 may be a portion of the TTI 215-a for transporting control information between the base station 105-a and at least the UE 115-a. Downlink control information (DCI) and group-common DCI are examples of control information. DCI may include control information for a particular UE, and group-common DCI may include control information for a group of UEs. The data channel 310 may be a shared data channel for transporting uplink data, downlink data, or both, and the base station 105-a may allocate resources of the data channel 310 to one or more UEs 115 for communication of the uplink data, downlink data, or both.

In some examples, a TTI may be further divided into two or more shortened TTIs (sTTIs). In the depicted example, TTI5 includes three sTTIs 315-a, 315-b, and 315-c. Each sTTI may be of the same duration, or at least one sTTI may have different duration than at least one other sTTI. Each sTTI 315 may include a control channel 305-a and a data channel 310-a. The control channel 305-a may be similar to the control channel 305, and the data channel 310-a may be similar to data channel 310 but of a shorter duration. For example, the data channel 310-a may include fewer OFDM symbol periods than data channel 310.

Figure 4:
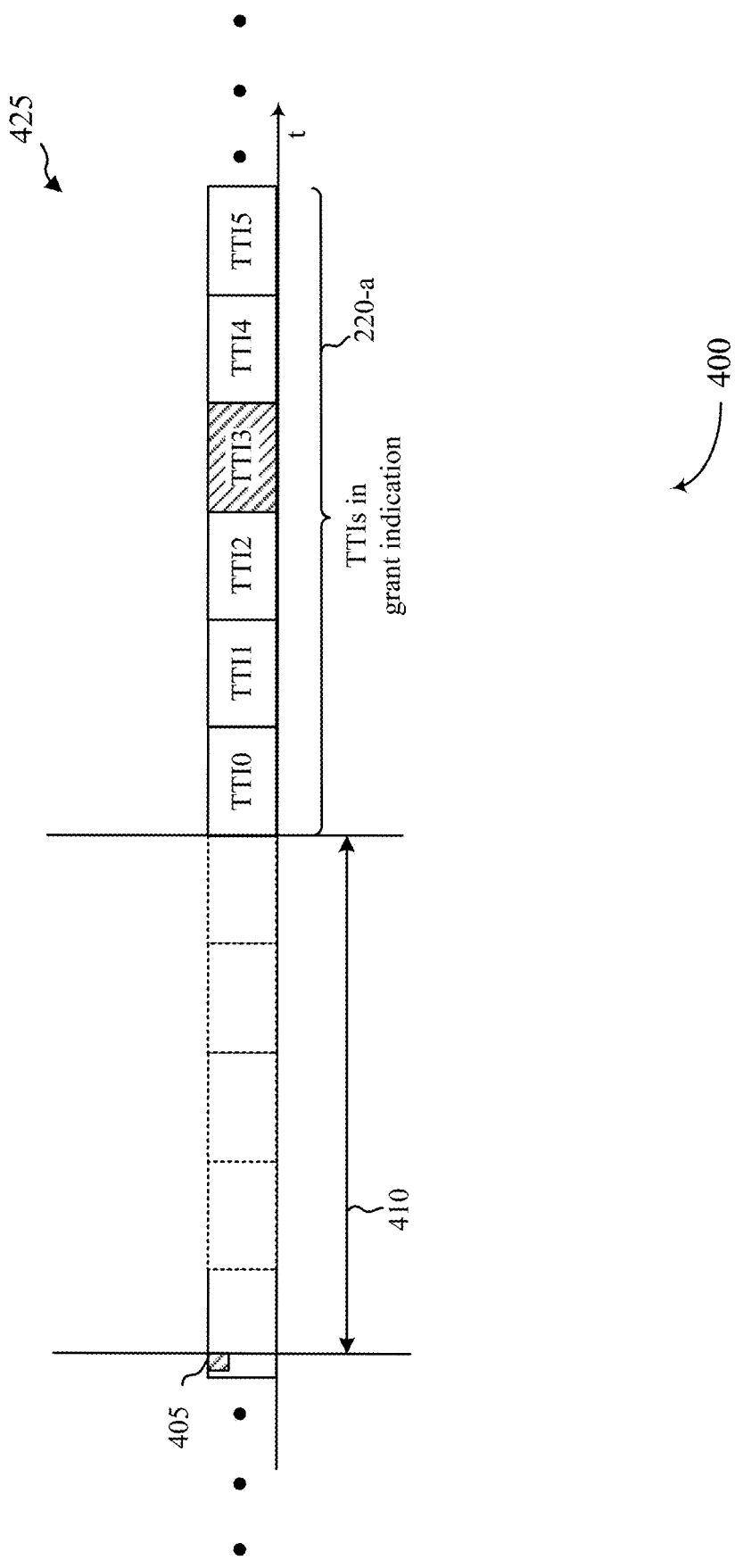
FIG. 4 illustrates an example diagram of a set of aggregated TTIs that supports discontinuous scheduling in accordance with aspects of the present disclosure.

In some examples, the base station 105-a may provide a grant of resources within a set of aggregated TTIs 220 to be used for communication of uplink data, downlink data, or both. FIG. 4 illustrates an example diagram 400 of a set of aggregated TTIs that supports discontinuous scheduling in accordance with various aspects of the present disclosure. At some time, a base station 105-a may determine to provide a UE with a grant of resources within a set of aggregated TTIs 220-a. In the depicted timeline 425, the base station 105-a may include a grant 405 in a control channel at TTI 215-b for providing UE 115-a a grant of resources within a set of aggregated TTIs 220-a. The allocated resources may include at least a portion of a bandwidth and one or more symbol periods of a data channel within each TTI of the set of aggregated TTIs 220-a. In some examples, the set of aggregated TTIs 220-a may be contiguous to one another in time and/or frequency. In other examples, two or more TTIs in the set of aggregated TTIs 220-a may be non-contiguous to one another in time and/or frequency. Two or more non-contiguous TTIs may be separated in time, frequency, or both.

In the depicted example, grant 405 indicates that UE 115-a is being granted resources in a set of aggregated TTIs 220-a, beginning at TTI0, and continuing through TTI5. A time duration 410 occurs between an end of the grant 405 and the beginning TTI0.

The grant 405 may be a multi-slot grant indication for identifying in which TTIs resources are being allocated to the UE 115-a. In an example, the grant 405 may be a bitmap that includes a sequence of bits indicating in which TTIs, or sTTIs in one or more TTIs, resources are being allocated to the UE 115-a. A bit in the sequence having a first value may indicate that resources are allocated in that TTI for the UE 115-a, and the bit having a second value may indicate that resources are not allocated in that TTI for the UE 115-a. With reference to FIG. 4, the bit sequence may indicate that the next four TTIs do not have resources allocated in that TTI for the UE 115-a, but the following six TTIs (e.g., TTI0 to TTI5) do have resources allocated in that TTI for the UE 115-a. In this example, the bit sequence in the bit map may be as follows [0, 0, 0, 0, 1, 1, 1, 1, 1, 1]. The bitmap is flexible to support contiguous and non-contiguous TTI aggregation.

In some examples, to reduce overhead, the bitmap may be an index into a set of possible TTI assignments. The base station 105-a may preconfigure with the UE 115-a with a set of possible TTI assignments, and the grant 405 may include an index to identify which configuration of the set of possible TTI configurations is being allocated to the UE 115-a. For example, a first index value in the set of possible TTI configurations may correspond to the following bit map sequence [0, 0, 0, 0, 1, 1, 1, 1, 1, 1], a second index value may correspond to the following bit map sequence [0, 0, 0, 0, 1, 0, 1, 1, 1, 1, 1, 1], a third index value may correspond to the following bit map sequence [0, 0, 0, 0, 1, 0, 0, 1, 1, 1, 1, 1], and a fourth index value may correspond to the following bit map sequence [0, 0, 0, 0, 1, 0, 0, 1, 0, 1, 1, 1, 1]. In this example, the index value may be a 2-bit sequence for distinguishing between the four different index values (e.g., 00 for first index, 01 for second index, 10 for third index, and 11 for fourth index). These techniques may be applied to create an index into a set of any number of possible TTI configurations. In further examples, the configurations may include TTIs of identical time durations, TTIs of different time durations, or the like.

In some examples, some TTIs, or sTTIs, within a set of TTIs specified in the grant 405 may be implicitly or explicitly excluded. In an example, certain TTIs and/or sTTIs may transport data at periodic or at known intervals to facilitate communication between the base station 105-a and the UE 115-a. A TTI for a random access channel for uplink and a TTI for synchronization for downlink are two such examples. In some examples, a TTI may be excluded because one or more of the symbols to be communicated in the TTI is configured for an opposite link direction than at least one of the other TTIs in the plurality of aggregated TTIs. For example, one or more of the symbols in the excluded TTI may be indicated (e.g., via configuration information received by the UE 115-a) as a downlink symbol (for an uplink grant) or as an uplink symbol (for a downlink grant). Other examples include sTTIs carrying channel state information reference signals (CSIRS) on the downlink, sounding reference signals (SRS) on the uplink, a short-UL-control block on the uplink, or the like. Further examples include TTIs reserved for forward compatibility. In some examples, the base station 105-a may semi-statically configure which TTIs and sTTIs are to be excluded. The base station 105-a may indicate and/or update the configuration in a master information block, a minimum system information block (mSIB), an other SIB (OSIB), radio resource control (RRC) messaging, group-common DCI signaling, or the like.

The periodic or known intervals of such excluded TTIs may be preconfigured and the UE 115-a may know to exclude such TTIs from TTIs in a grant 405. In other examples, the grant 405 may provide an explicit indication that excludes such TTIs from the grant of resources. A TTI that is to be excluded from the grant of resources is referred to herein as an excluded TTI, and a sTTI within a TTI that is to be excluded from the grant of resources is referred to herein as an excluded sTTI. In FIG. 4, TTI3 is shaded and is an example of an excluded TTI.

In some examples, the grant 405 may include a starting TTI indication and an ending TTI indication and/or a TTI number indication. The starting TTI indication may identify a first TTI that includes a grant of resources for the UE 115-a. In FIG. 4, the starting TTI indication may identify TTI0. The ending TTI indication may identify a last TTI that includes a grant of resources for the UE 115-a. In FIG. 4, the ending TTI indication may identify TTI5. The TTI number indicator may include the total number of TTIs in which resources are granted to the UE 115-a. In FIG. 4, the TTI number indicators may specify that 6 TTIs (e.g., TTI0 to TTI5) grant resources to the UE 115-a. The starting TTI indication may be a relative indicator that identifies a number of TTIs between the TTI including grant 405 and the beginning TTI (e.g., TTI0). The starting TTI indication may be a relative indicator that identifies a number of TTIs between the TTI including grant 405 and the ending TTI (e.g., TTI5).

In some examples, the ending TTI indication and/or the TTI number indication may or might not account for one or more excluded TTIs and/or one or more excluded sTTIs that are within the set of aggregated TTIs 220-a. In an example, the UE 115-a may determine that the grant 405 includes an excluded TTI within the set of aggregated TTIs 220-a, and adjust the ending TTI indication to include an additional TTI for each excluded TTI within the set of aggregated TTIs 220-a. In FIG. 4, for example, the ending TTI indication may identify TTI4. The UE 115-a may determine that TTI3 is an excluded TTI, and adjust the ending TTI indication to be TTI5. In another example, the TTI number indication may indicate five TTIs. The UE 115-a may determine that TTI3 is an excluded TTI, and adjust the TTI number to be six TTIs. In some cases, the UE-115-a may communicate using fewer TTIs than the number of TTIs indicated by the starting TTI, the ending TTI, and/or the TTI number; e.g., by excluding the excluded TTI without adjusting the ending TTI indication or the TTI number indication.

The UE 115-a may have the option to similarly adjust the ending TTI and/or the TTI number indicator when a TTI within the set of aggregated TTIs 220-a includes one or more excluded sTTIs. In some examples, the UE 115-a may maintain a TTI count of communicated TTIs of a set of aggregated TTIs based on determining whether to include one or more excluded TTIs in the TTI count. In some examples, the UE 115-a may count the number of TTIs, and include in the count any TTIs having at least one excluded sTTI, but not include in the count any excluded TTI. In some examples, the UE 115-a may include one or more excluded TTIs in the TTI count. In some examples, not including an excluded TTI in a count may provide the benefit that a longer time-span for a set of aggregated TTIs may be specified for the same grant overhead (e.g., DCI overhead).

Figure 5:
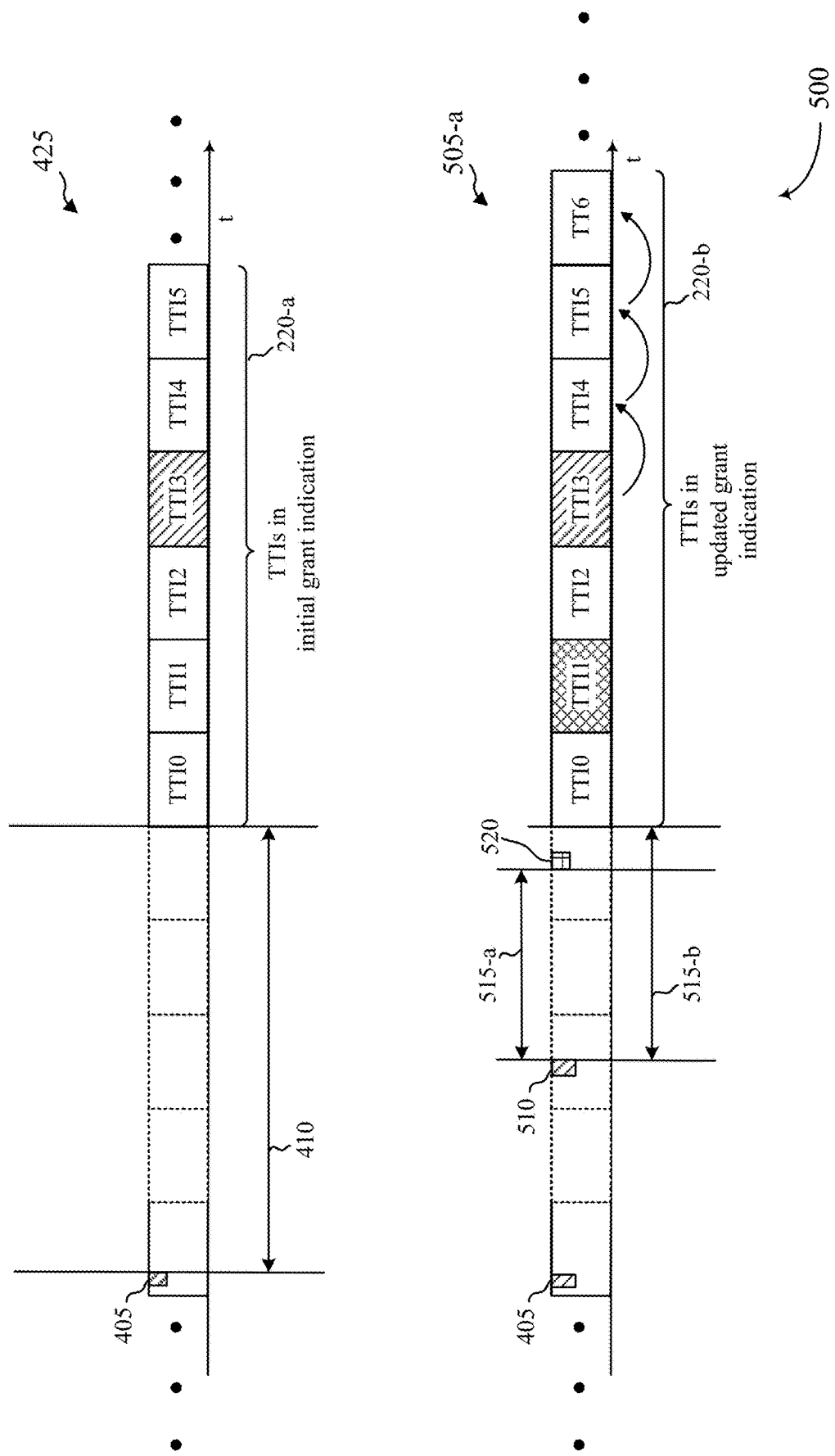
FIG. 5 illustrates an example diagram of TTI reassignment with rate-matching that supports discontinuous scheduling in accordance with aspects of the present disclosure.

In some examples, a TTI may be reassigned after transmission of grant 405. FIG. 5 illustrates an example diagram 500 of TTI reassignment with rate-matching that supports discontinuous scheduling in accordance with various aspects of the present disclosure. The base station 105-a may have the option to send a TTI reassignment indication 510 after sending the grant 405. The TTI reassignment indication 510 may reassign resources of one or more TTIs in the set of aggregated TTIs identified in the grant 405. Timeline 425 corresponds to a set of aggregated TTIs determined based on an initial grant 405, similar to the timeline 425 shown in FIG. 4, and timeline 505-a corresponds to a set of aggregated TTIs determined based on a TTI reassignment indication 510 that reassigns a TTI within the initial grant 405. A TTI may be reassigned, for example, to transport higher priority data. Examples of higher priority data may include URLLC data, a TTI reconfigured for forward compatibility, or the like. Higher priority data may preempt other transmissions (e.g., pre-empt regular enhanced mobile broadband (eMBB) transmissions). The TTI reassignment indication 510 may be part of DCI, group-common DCI, or the like. In other examples, the base station 105-a may transmit the TTI reassignment indication 510 using radio resource control (RRC) signaling.

If the UE 115-a has enough time to process the TTI reassignment indication 510 before a beginning TTI of the assigned set of aggregated TTIs 220-a, the UE 115-a may treat the TTI reassignment indication 510 as if it was provided along with the grant 405. Timeline 425 may represent how communication would have occurred in the set of aggregated TTIs 220-a corresponding to initial grant 405. Timeline 505-a includes the TTI reassignment indication 510 transmitted after grant 405. In timeline 505-a, the TTI reassignment indication 510 indicates that TTI1 is being reassigned, and hence TTI1 is an excluded slot.

The base station 105-a may process one or more capabilities of the UE 115-a for determining whether the UE 115-a has enough time to process the TTI reassignment indication 510. When a connection is initially set up, or at other times, the base station 105-a may query the UE 115-a for one or more capabilities. At some time, the base station 105-a may desire to reassign resources of a TTI that it previously granted to the UE 115-a in an initial grant 405. The base station 105-a may determine one or more response time thresholds for the UE. A response time threshold may be an amount of time for the UE 115-s to process and respond based on the one or more capabilities of the UE 115-a. A first response time threshold may correspond to the amount of time between when the UE 115-a receives data within resources of a TTI, decodes and processes the data, and transmits an acknowledgment message to indicate whether the decoded data passed error detection. For example, a k1 value is a minimum amount of time between when UE 115-a receives and decodes a physical downlink shared channel (PDSCH), and transmits an acknowledgment message on the uplink indicating whether PDSCH data passed error detection. In this example, the first response time threshold may be set at the k1 value. In some examples, the base station 105-a may measure how long after data is sent in a shared data channel for the UE to reply with an acknowledgment message, and may set the first response time threshold using the measured actual timing. In some examples, the measured actual timing may be a statistical value (e.g., average), a worst case value, or the like.

In FIG. 5, for example, the base station 105-a may determine a duration of time interval 515-a. Time interval 515-a may be the amount of time between when TTI reassignment indication 510 is transmitted and when the UE 115-a is scheduled to send an acknowledgment message 520. The base station 105-a may compare the duration of time interval 515-a to the first time threshold, and may transmit the TTI reassignment indication 510 if the duration of time interval 515-a is greater than or equal to the first response time threshold.

A second response time threshold may correspond to the amount of time between when the UE 115-a receives a grant, decodes and processes the grant, and can receive data within resources of a TTI specified in the grant. For example, a k2 value is a minimum amount of time between when UE 115-a receives and decodes a grant within a physical downlink control channel (PDCCH), and transmits uplink data in a physical uplink shared channel (PUSCH) using resources specified in the grant. The second response time threshold may be set at the k2 value. In some examples, the base station 105-a may measure how long after a grant is sent in a control channel the UE is capable of transmitting using resources in a TTI specified in the grant, and may set the second response time threshold using the measured actual timing. In some examples, the measured actual timing may be a statistical value (e.g., average), a worst case value, or the like. In some examples, the measured actual timing may be a function of positive acknowledgements and negative acknowledgements, where the threshold corresponds to when a rate positive acknowledgements satisfies a minimum positive acknowledgement rate (e.g., timing at which at least 99% of acknowledgments are positive acknowledgements).

A response time threshold may be set based on other capabilities of the UE, or any combination of UE capabilities.

In FIG. 5, for example, the base station 105-a may determine an amount of time in time interval 515-b. Time interval 515-b may be the amount of time between when TTI reassignment indication 510 is transmitted and a beginning TTI of the set of aggregated TTIs 220-b. The base station 105-a may compare the duration of time interval 515-b to the second response time threshold, and may transmit the TTI reassignment indication 510 if the duration of time interval 515-b is greater than or equal to the second time threshold.

In some instances, the base station 105-a may transmit the TTI reassignment indication 510 even if one or more response thresholds are not satisfied. In such a scenario, the UE 115-a may determine that it does not have sufficient time to process the TTI reassignment indication 510. If there is insufficient time, the UE 115-a may ignore the TTI reassignment indication 510. For example, the UE 115-a may treat the TTI reassignment indication 510 as falsely passing error detection (e.g., false CRC pass on PDCCH) and ignore the TTI reassignment indication 510. When the reassigned, and now excluded, TTI is received and decoded, the UE 115-a may determine that data in the resources within the reassigned TTI (e.g., TTI3) differ from what the UE 115-a expected (e.g., the data fails an error detection procedure, cyclic redundancy check (CRC), or the like), and may transmit a negative acknowledgement asking the base station 105-a to retransmit.

In some examples, the UE 115-a may be able to partially process the TTI reassignment indication 510. Partial processing may impact computation of a transport block size. In some examples, the base station 105-a, in the downlink, may be transmitting at least a portion of a transport block within the resources of the set of aggregated TTIs 220 specified in the grant 405. Computation of a transport block size (TBS) typically accounts for an excluded TTI (e.g., TTI3 in the example of FIG. 5). In some circumstances, the TTI reassignment indication 510 indicating the excluded TTI occurs after the TBS has been computed and after transmission of some portion of the transport block has already begun. The base station 105-a may thus not update the computation of the TBS size, and the UE 115-a may determine that the excluded TTI or excluded sTTI has been punctured without re-computing the TBS. For example, the UE 115-a may perform discontinuous transmission (DTX) of the excluded TTI without re-computing the TBS. For the uplink, the UE 115-a may not re-compute the TBS size in a similar manner with the roles of the base station and UE being reversed in the prior example.

In some examples, the UE 115-a may have sufficient time to receive and process the TTI reassignment indication 510, and may transmit an acknowledgement message 520 indicating that the TTI reassignment indication 510 passed error detection prior to a beginning TTI of the adjusted set of aggregated TTIs 220-b (e.g., before TTI). The acknowledgement message 520 may be, for example, a dedicated acknowledgement of DCI or PDCCH. In another example, the acknowledgement message 520 may be for a scheduled PDSCH or PUSCH transmission. In a further example, the acknowledgement message 520 may be an acknowledgement for a group-common-DCI.

In some cases, the UE 115-a may update the set of aggregated TTIs 220-a based on the TTI reassignment indication 510. In some examples, the UE 115-a may perform rate-matching to update the set of aggregated TTIs 220-*a* based on the TTI reassignment indication 510. Rate-matching may involve shifting a subset of the set of aggregated TTIs 220-*a* by at least one TTI to determine an adjusted set of aggregated TTIs 220-*b*. In FIG. 5, for example, TTI reassignment indication 510 indicates that TTI3 is being excluded. In response, the UE 115-*a* may shift each the subset of the set of aggregated TTIs 220-*a* back by one TTI. Thus, the data the UE 115-*a* initially expected to be received in the resources of TTI3, the UE 115-*a* now expects to receive in the resources of TTI4. The data the UE 115-*a* initially expected to be received in the resources of TTI4, the UE 115-*a* now expects to receive in the resources of TTI5, and so forth. In this example, the UE 115-*a* determines, from the grant 405 and TTI reassignment indication 510, that the adjusted set of aggregated TTIs has been extended by one TTI. In some examples, the base station 105-*a* may preconfigure the UE 115-*a* with adjustment instructions specifying how the UE 115-*a* is to adjust the set of aggregated TTIs when a TTI reassignment indication 510 is received. For example, the base station 105-*a* may transmit the adjustment instructions in, for example, radio resource control (RRC) signaling. In other examples, the TTI reassignment indication 510 may include the adjustment instructions in a DCI, a group-common DCI, or the like. In some examples, the base station 105-*a* may generate the adjustment instructions based on one or more capabilities of the UE 115-*a*, measurements of actual response timings, or the like.

When a TTI reassignment indication 510 is sent after the grant 405 to identify one or more excluded TTIs, the base station 105-*a* may adjust the measured actual response timings to account for the one or more excluded TTIs. For example, if the UE 115-*a* extends the grant 405 to include an additional TTI because of the TTI reassignment indication 510, the base station 105-*a* may adjust the measured actual response timings to account for the additional TTI for setting and/or updating a response timing threshold.

Figure 6:
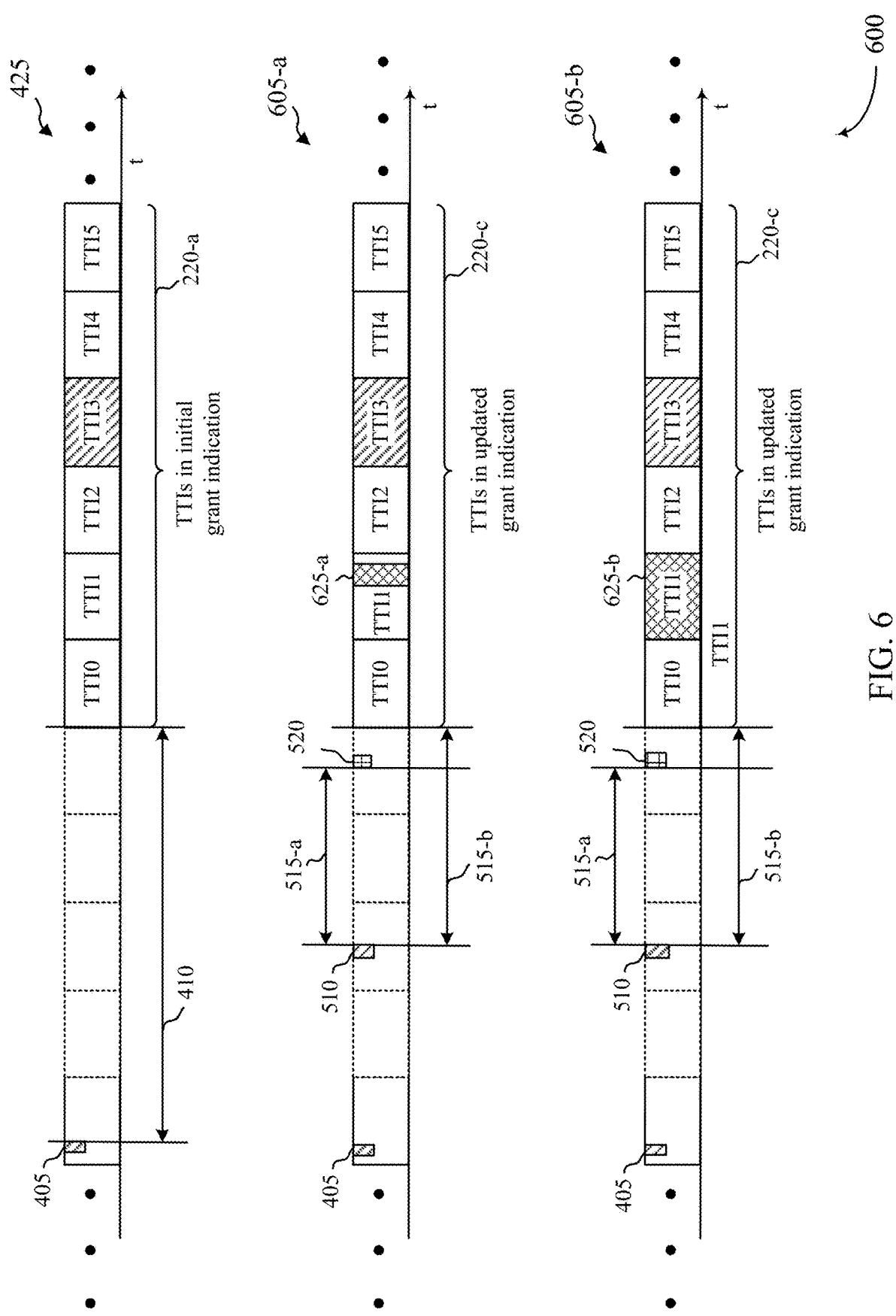
FIG. 6 illustrates an example diagram of TTI reassignment with puncturing that supports discontinuous scheduling in accordance with aspects of the present disclosure.

In some instances, a TTI identified by the TTI reassignment indication 510 may be punctured. FIG. 6 illustrates an example diagram 600 of TTI reassignment with puncturing that supports discontinuous scheduling in accordance with various aspects of the present disclosure. Puncturing may involve discarding bits previously scheduled to be transmitted within resources of a TTI. FIG. 6 depicts timeline 425, as previously described in FIGS. 4-5, without data puncturing, timeline 605-*a* that depicts sTTI puncturing, and timeline 605-*b* that depicts TTI puncturing. As described above, in timeline 425, a grant 405 of resources is associated with a set of aggregated TTIs 220-*a*. In timeline 605-*a*, the base station 105-*a* may determine to transmit a TTI reassignment indication 510, and the determination may be based on timing intervals 515-*a*, 515-*b*, as described in FIG. 5. The UE 115-*a* may also transmit an acknowledgment 520 in response to the TTI reassignment indication 510. In timeline 605-*a*, one or more sTTIs in TTI1 may be punctured, as represented by the shading at 625-*a*. The resources of the one or more punctured sTTIs, which may include at least some of the bandwidth, may be used to communicate different data than the data scheduled by the grant 405. In the downlink, the base station 105-*a* may transmit the different data to the UE 115-*a* or a different UE within the resources corresponding to the punctured one or more sTTIs. In the uplink, the UE 115-*a* may transmit the different data to the base station 105-*a* or other device within the resources corresponding to the punctured one or more sTTIs. Timeline 605-*b* is similar to timeline 605-*a*, but up to all of the resources of TTI3 are punctured as represented by the shading at 625-*b*.

Figure 7:
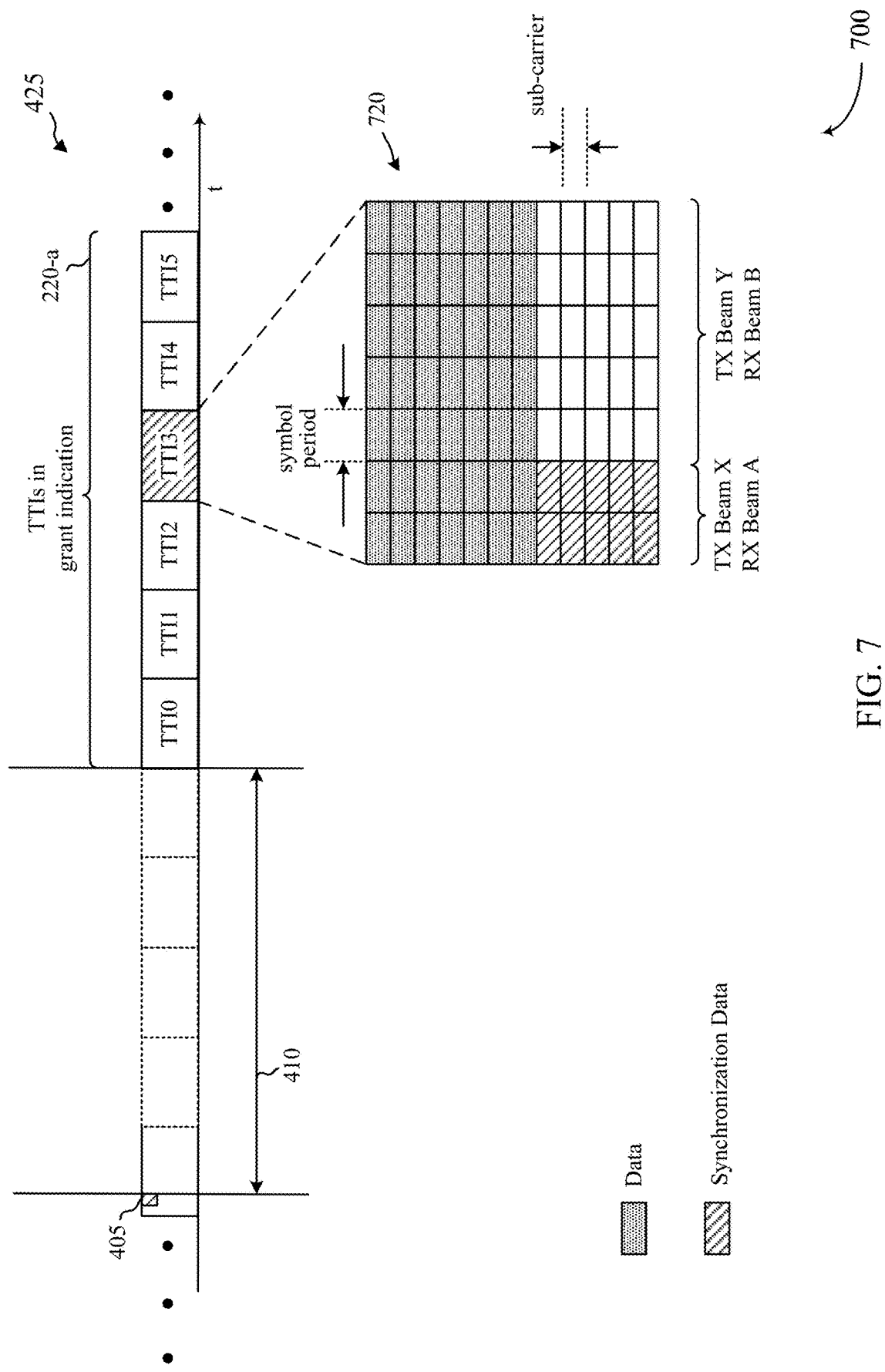
FIG. 7 illustrates an example diagram of multiple beams that supports discontinuous scheduling in accordance with aspects of the present disclosure.

In some examples, beamforming may be used to beamform data on multiple beams within an excluded TTI. FIG. 7 illustrates an example diagram 700 of a set of aggregated TTIs communicated using multiple beams that supports discontinuous scheduling in accordance with various aspects of the present disclosure. Depicted is timeline 425 previously described in FIG. 4, and resources 720 of the excluded TTI (e.g., TTI3) are shown. In the depicted example, the resources 720 may correspond to a set of sub-carriers that collectively span a bandwidth and a set of symbol periods that collectively span the TTI. Beamforming techniques may be used to transmit symbols on sub-carriers using one or more transmission beams, and a receiver may select one or more receive beams to receive symbols transmitted using the one or more transmission beams. In the depicted example, transmission (TX) beam X may be used to transmit symbols within a first two columns of resources 720, and TX beam Y may be used to transmit symbols within the remaining columns of resources 720.

In an example, an excluded TTI may be a synchronization TTI in which synchronization signals are communicated for maintaining synchronization between the base station 105-*a* and the UE 115-*a*. The synchronization TTI may include synchronization symbols that use a different TX beam than one or more transmission beams used to transmit symbols carrying other types of data (e.g., a different beam is used to transmit PDSCH data). The base station 105-*a* may frequency division multiplex (FDM) synchronization symbols and data symbols on a first TX beam within the synchronization TTI, and may transmit data symbols on a second, different TX beam within the synchronization TTI. The UE 115-*a* may perform a synchronization procedure with the base station 105-*a* to determine a beam direction for a first receive beam to receive the synchronization symbols and the data symbols frequency division multiplexed on the first TX beam, and a second first receive beam to receive the data symbols on the second TX beam.

In the depicted example, the base station 105-*a* may frequency division multiplex data and synchronization data onto symbols for transmission on TX Beam X using the first two symbol periods of the resources 720. In the depicted example, the top six sub-carriers of resources 720 on TX Beam X transport data (represented using a first type of shading), and the bottom four sub-carriers of resources 720 on TX Beam X transport synchronization data (represented using a second type of shading). Other sub-carrier configurations for frequency division multiplexing data and synchronization data onto symbols for transmission on TX Beam X may also be used. The base station 105-*a* may frequency division multiplex data onto symbols for transmission on TX Beam Y using the remaining symbol periods of the resources 720. The unshaded portion of the resources 720 may be used to transmit other data on TX Beam Y. In the depicted example, receive (RX) beam A may be used to receive symbols transmitted on TX Beam X, and RX beam B may be used to receive symbols transmitted on TX Beam Y.

These beamforming techniques may be applied in other scenarios. For example, for a RACH TTI, a UE 115-*a* may similarly frequency division multiplex RACH data and other uplink data onto a same transmission beam. In another example, the base station 105-*a*, the UE 115-*a*, or either, may frequency division multiplex symbols onto a beam in one or more TTIs reserved for forward-compatibility. Moreover, these beamforming techniques described herein may be applied for both control and data transmissions.

In some examples, the TTI reassignment indication 510 may result in the UE 115-*a* being scheduled to transmit acknowledgment data and channel state information (CSI) in a same TTI. To conserve resources, the UE 115-*a* may determine to merge the acknowledgment data and the CSI.

Figure 8:
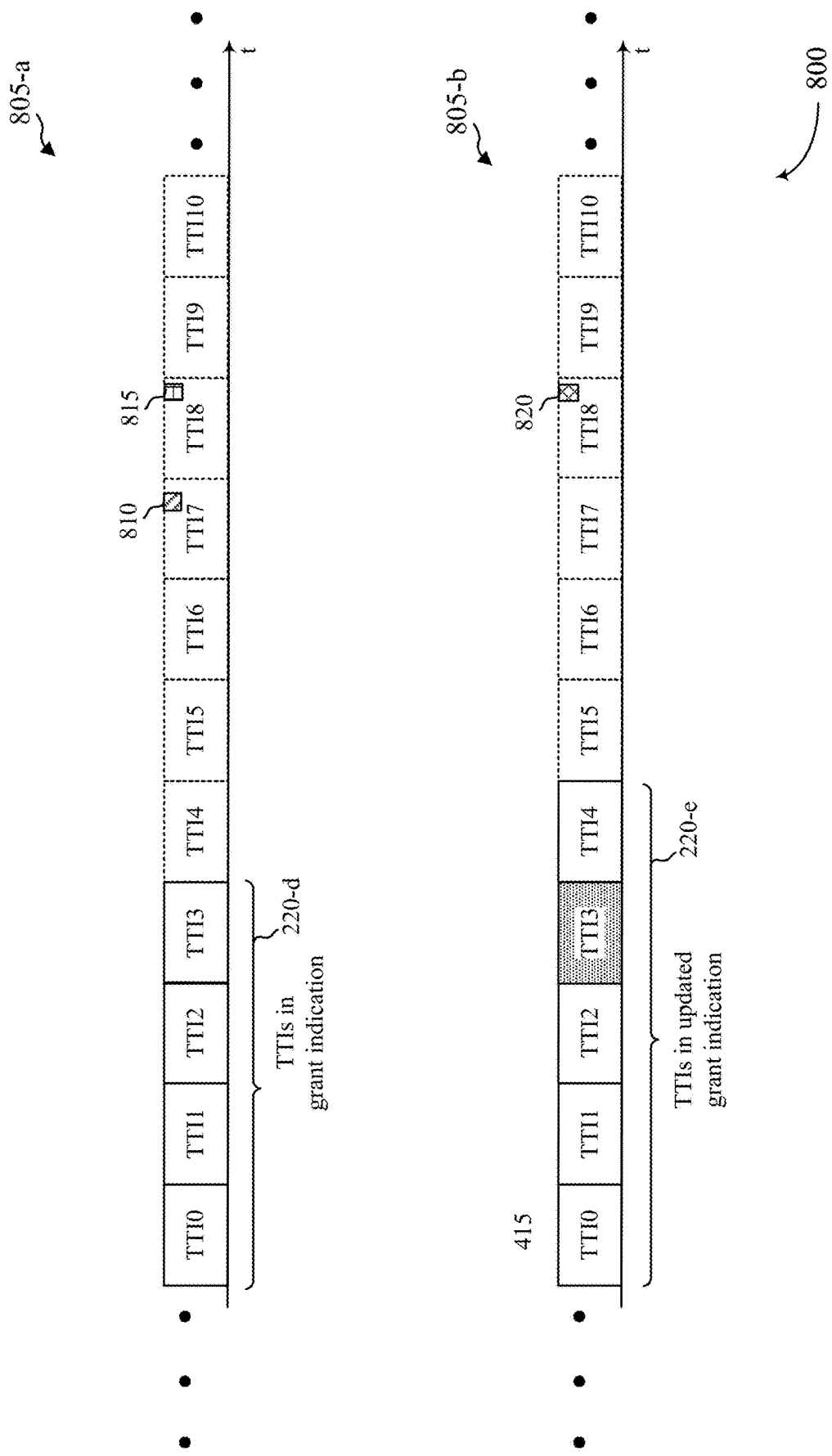
FIG. 8 illustrates an example diagram of merging channel state information and acknowledgment data that supports discontinuous scheduling in accordance with aspects of the present disclosure.

FIG. 8 illustrates an example diagram 800 of merging channel state information and acknowledgment data that supports discontinuous scheduling in accordance with various aspects of the present disclosure. Timeline 805-*a* corresponds to a set of aggregated TTIs 220-*d* in an initial grant 405, and timeline 805-*b* corresponds to a set of aggregated TTIs 220-*e* after updating the initial grant 405 based on a TTI reassignment indication 510. The set of aggregated TTIs 220-*d* includes TTI0 to TTI3. and the adjusted set of aggregated TTIs 220-*e* includes TTI0 to TTI4, with TTI3 being changed to an excluded TTI. The UE 115-*a* is scheduled to transmit an acknowledgment message 810 a defined number of TTIs after an ending TTI in the set of aggregated TTIs 220. The acknowledgment message 810 may indicate whether data received in the resources of the set of aggregated TTIs 220-*d* passed error detection. In the example depicted in timeline 805-*a*, the UE 115-*a* is scheduled to transmit acknowledgment message 810 in the 4th TTI after the ending TTI (e.g., in TTI7). The UE 115-*a* may also be scheduled to send CSI 815 to be base station 105-*a* at periodic time intervals or at predefined times. The CSI 815 may include information about a communication channel used by the base station 105-*a* and the UE 115-*a*. Examples of CSI include one or more of a Channel Quality Indicator (CQI), a precoding matrix indicator (PMI), a precoding type indicator (PTI), a rank indication (RI), or the like. In the example depicted in timeline 805-*a*, the UE 115-*a* may be scheduled to transmit CSI 815 in TTI8.

Because of a TTI reassignment indication 510, the UE 115-*a* may adjust the set of aggregated TTIs 220 from the set of aggregated TTIs 220-*d* shown in timeline 805-*a* to the set of aggregated TTIs 220-*e* shown in timeline 805-*b*. The adjustment may move back the location of where the acknowledgment message 810 is scheduled to be transmitted, and the adjusted location may overlap with the TTI in which CSI 815 is scheduled to be transmitted. In the example depicted in timeline 805-*b*, the acknowledgment message 810 and CSI 815 are both scheduled to be transmitted in TTI8. Rather than separately sending the acknowledgment message 810 and CSI 815 in the same TTI, the UE 115-*a* may merge the acknowledgment message 810 and CSI 815. For example, the UE 115-*a* may add an acknowledgment bit to the CSI 815. The acknowledgment bit may be set to a first value if the data received in the resources of the set of aggregated TTIs 220-*e* passed error detection (e.g., bit set to 1), and set to a second value if the data received in the resources of the set of aggregated TTIs 220-*e* did not pass error detection (e.g., bit set to 0). The UE 115-*a* may transmit a merged feedback message 820 that includes the CSI 815 with the added acknowledgment bit.

Figure 9:
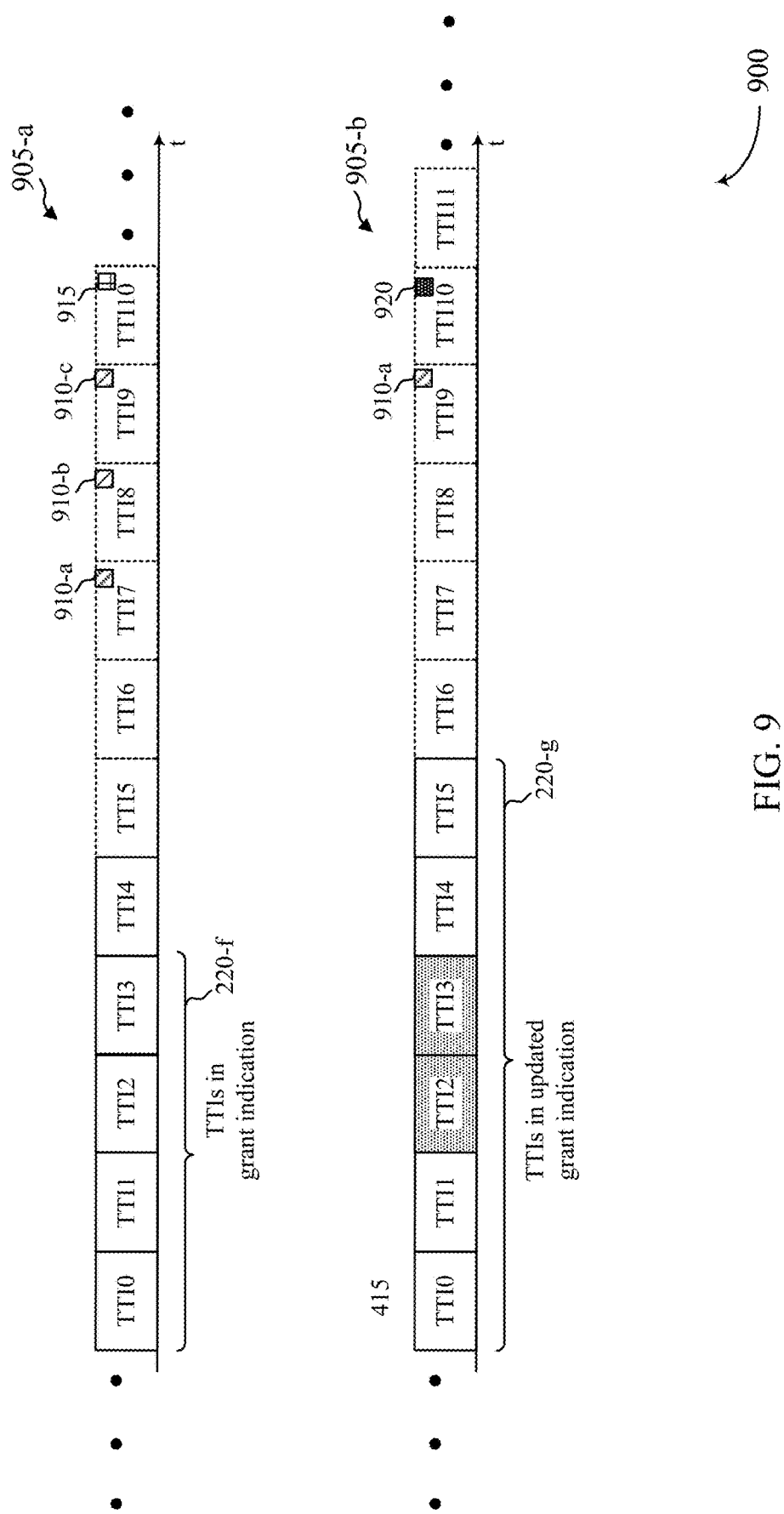
FIG. 9 illustrates an example diagram of merging channel state information and acknowledgment data that supports discontinuous scheduling in accordance with aspects of the present disclosure.

In some examples, an acknowledgment message may be transported over multiple TTIs, and the techniques described herein may be used for merging a multi-TTI acknowledgment with CSI. FIG. 9 illustrates an example diagram 900 of merging channel state information and acknowledgment data that supports discontinuous scheduling in accordance with various aspects of the present disclosure. Timeline 905-*a* corresponds to a set of aggregated TTIs 220-*f* in an initial grant 405, and timeline 905-*b* corresponds to a set of aggregated TTIs 220-*g* after updating the initial grant 405 based on a TTI reassignment indication 510. The set of aggregated TTIs 220-*f* includes TTI0 to TTI3. and the adjusted set of aggregated TTIs 220-*g* includes TTI0 to TTI4, with TTI2 and TTI3 each being changed to an excluded TTI. The UE 115-*a* is initially scheduled to transmit a multi-TTI acknowledgment message 910 for acknowledging whether data received in one or more TTIs of the set of aggregated TTIs 220 passed error detection. In the depicted example in timeline 905-*a*, the multi-TTI acknowledgment message 910 includes three acknowledgment transmissions 910-*a*, 910-*b*, and 910-*c* that are scheduled to be transmitted in TTI7, TTI8, and TTI9, respectively. The acknowledgment transmissions 910-*a*, 910-*b*, and 910-*c* may be repetitions of the same transmission, or may include a joint encoding and transmission of the single acknowledgment message 910 over three TTIs. The UE 115-*a* may also be scheduled to send CSI 915 to be base station 105-*a* at periodic time intervals or at predefined times. In the example depicted in timeline 905-*a*, the UE 115-*a* may be scheduled to transmit CSI 915 in TTI10.

Because of a TTI reassignment indication 510, the UE 115-*a* may adjust the set of aggregated TTIs 220 from the set of aggregated TTIs 220-*f* shown in timeline 905-*a* to the set of aggregated TTIs 220-*g* shown in timeline 905-*b*. The adjustment may move back the location of where the acknowledgment transmissions 910-*a*, 910-*b*, and 910-*c* are scheduled to be transmitted, and one of the acknowledgment transmissions 910-*a*, 910-*b*, and 910-*c* may overlap with the TTI in which CSI 915 is scheduled to be transmitted. In the example depicted in timeline 905-*b*, the acknowledgment transmissions 910-*a*, 910-*b*, and 910-*c* are each shifted back by two TTIs such that acknowledgment transmission 910-*b* overlaps with CSI 915 in TTI10. If the UE has already started transmission of the multi-TTI acknowledgment message 910 (e.g., already transmitted acknowledgment transmission 910-*a*), the UE 115-*a* may cancel the remainder of the multi-TTI acknowledgment message 910 and merge the remaining acknowledgment transmissions (e.g., 910-*b*, 910-*c*) with the CSI 915. Similar to the description above, the UE 115-*a* may add an acknowledgment bit to the CSI 915. In the depicted example, the UE 115-*a* may add an acknowledgment bit for each of the acknowledgment transmissions 910-*b*, 910-*c* to the CSI 915 to form a merged feedback message 920, and may transmit the merged feedback message 920 in TTI10 that includes two additional acknowledgment bits.

Figure 10:
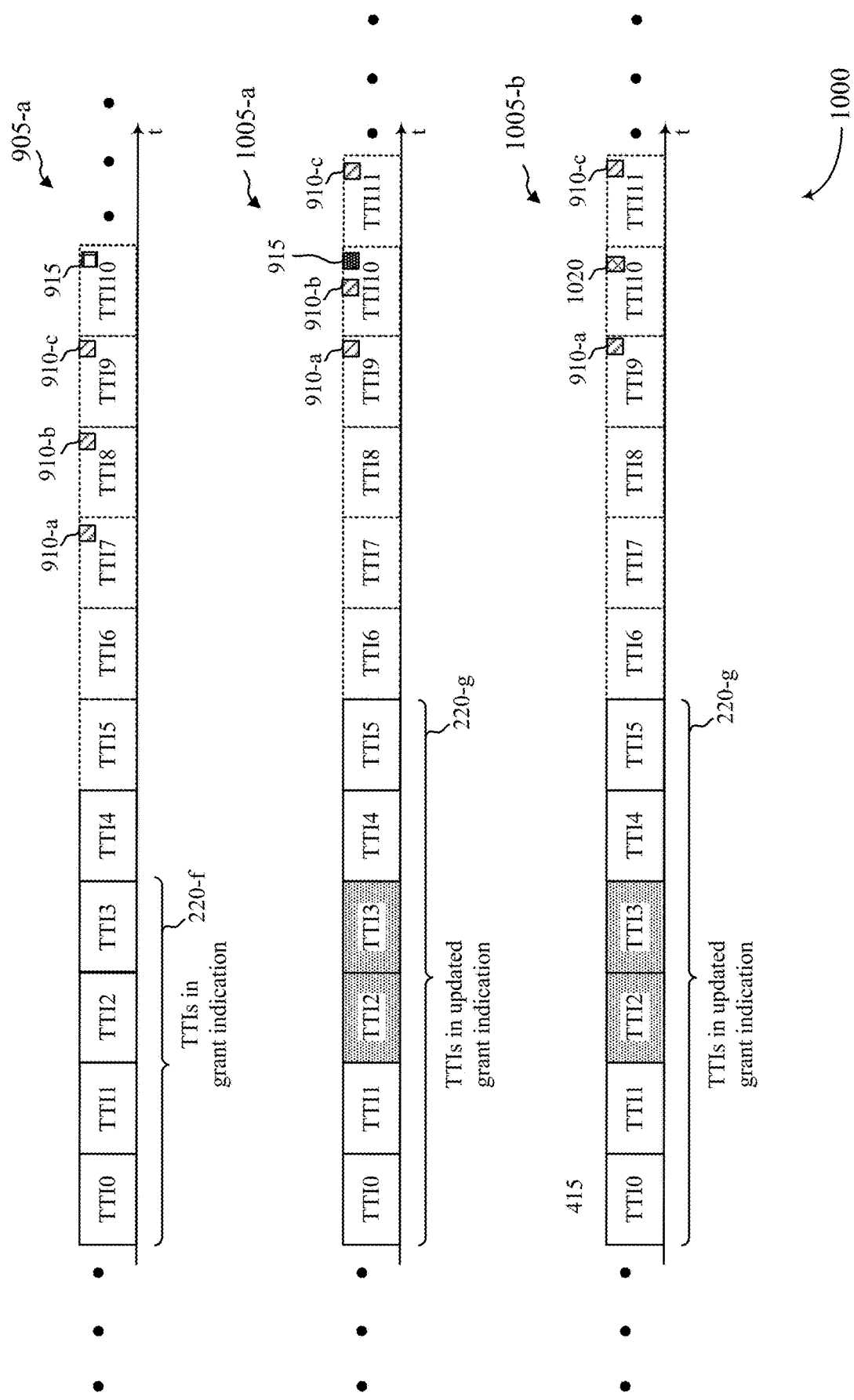
FIG. 10 illustrates an example diagram of merging channel state information and acknowledgment data that supports discontinuous scheduling in accordance with aspects of the present disclosure.

The UE 115-*a* may merge a multi-TTI acknowledgment message with a CSI in other manners. FIG. 10 illustrates an example diagram 1000 of merging channel state information and acknowledgment data that supports discontinuous scheduling in accordance with various aspects of the present disclosure. Timeline 905-*a*, is the same timeline as shown in FIG. 9, corresponds to a set of aggregated TTIs 220-*f* in an initial grant 405. Timelines 1005-*a* and 1005-*b* correspond to a set of aggregated TTIs 220-*g* after updating the initial grant 405 based on a TTI reassignment indication 510. The set of aggregated TTIs 220-*f* includes TTI0 to TTI3, and the adjusted set of aggregated TTIs 220-*g* includes TTI0 to TTI4, with TTI2 and TTI3 each being changed to an excluded TTI. The UE 115-*a* is scheduled to transmit a multi-TTI acknowledgment message 910 for acknowledging whether data received in one or more TTIs of the set of aggregated TTIs 220 passed error detection. In the depicted example of timeline 905-*a*, the multi-TTI acknowledgment message 910 includes three acknowledgment transmissions 910-*a*, 910-*b*, and 910-*c* that are scheduled to be transmitted in TTI7, TTI8, and TTI9, respectively. The UE 115-*a* may also be scheduled to send CSI 915 to be base station 105-*a* at periodic time intervals or at predefined times. In the example depicted in timeline 905-*a*, the UE 115-*a* may be scheduled to transmit CSI 915 in TTI10.

Because of a TTI reassignment indication 510, the UE 115-*a* may adjust the set of aggregated TTIs 220 from the set of aggregated TTIs 220-*f* shown in timeline 905-*a* to the set of aggregated TTIs 220-*g* shown in timelines 1005-*a* and 1005-*b*. The adjustment may move back the location of where the acknowledgment transmissions 910-*a*, 910-*b*, and 910-*c* are scheduled to be transmitted, and one of the acknowledgment transmissions 910-*a*, 910-*b*, and 910-*c* may overlap with the TTI in which CSI 915 is scheduled to be transmitted. In the example depicted in timeline 1005-*a*, the acknowledgment transmissions 910-*a*, 910-*b*, and 910-*c* are each shifted back by two TTIs such that acknowledgment transmission 910-*b* overlaps with CSI 915 in TTI10 in timelines 1005-*a* and 1005-*b*. In timeline 1005-*a*, the UE 115-*a* may transmit both acknowledgment transmission 910-*b* and CSI 915 in the same TTI. The UE 115-*a* may use, for example, frequency division multiplexing, spatial division multiplexing, or the like to transmit both the acknowledgment transmission 910-*b* and CSI 915 in the same TTI (e.g., transmit both in TTI10).

In timeline 1005-*b*, the UE 115-*a* may transmit the non-overlapping acknowledgment transmissions 910-*a* and 910-*c* in the updated locations (e.g., respectively in TTI9 and TTI11), and generate a feedback message 1020. In some examples, the UE 115-*a* may DTX transmission of the acknowledgment transmission 910-*b* in the overlapping TTI and instead transmit the CSI 915, but not the acknowledgment transmission 910-*b*, as the feedback message 1020. In other examples, the feedback message 1020 may be a merged feedback message by merging acknowledgment transmission 910-*b* and CSI 915, similar to the discussion of the feedback message 820 provided above in FIG. 8. The techniques described herein for merging an acknowledgment into subsequent CSI are examples, and these techniques may apply to other combinations of uplink control information. For example, CSI could be merged into an acknowledgment, two different types of CSI could be merged (e.g., merge periodic and aperiodic CSI), or the like.

Advantageously, the examples described herein may enable a wireless communication system as described herein to reassign a TTI that was previously assigned in a grant. A determination of whether to reassign a TTI may consider capabilities of a UE to process a TTI reassignment indication prior to a beginning of a set of aggregated TTIs associated with the grant. Moreover, resources may be conserved by merging of acknowledgment data and CSI to account for a change in which TTI an acknowledgment message is scheduled to be transmitted.

Figure 11:
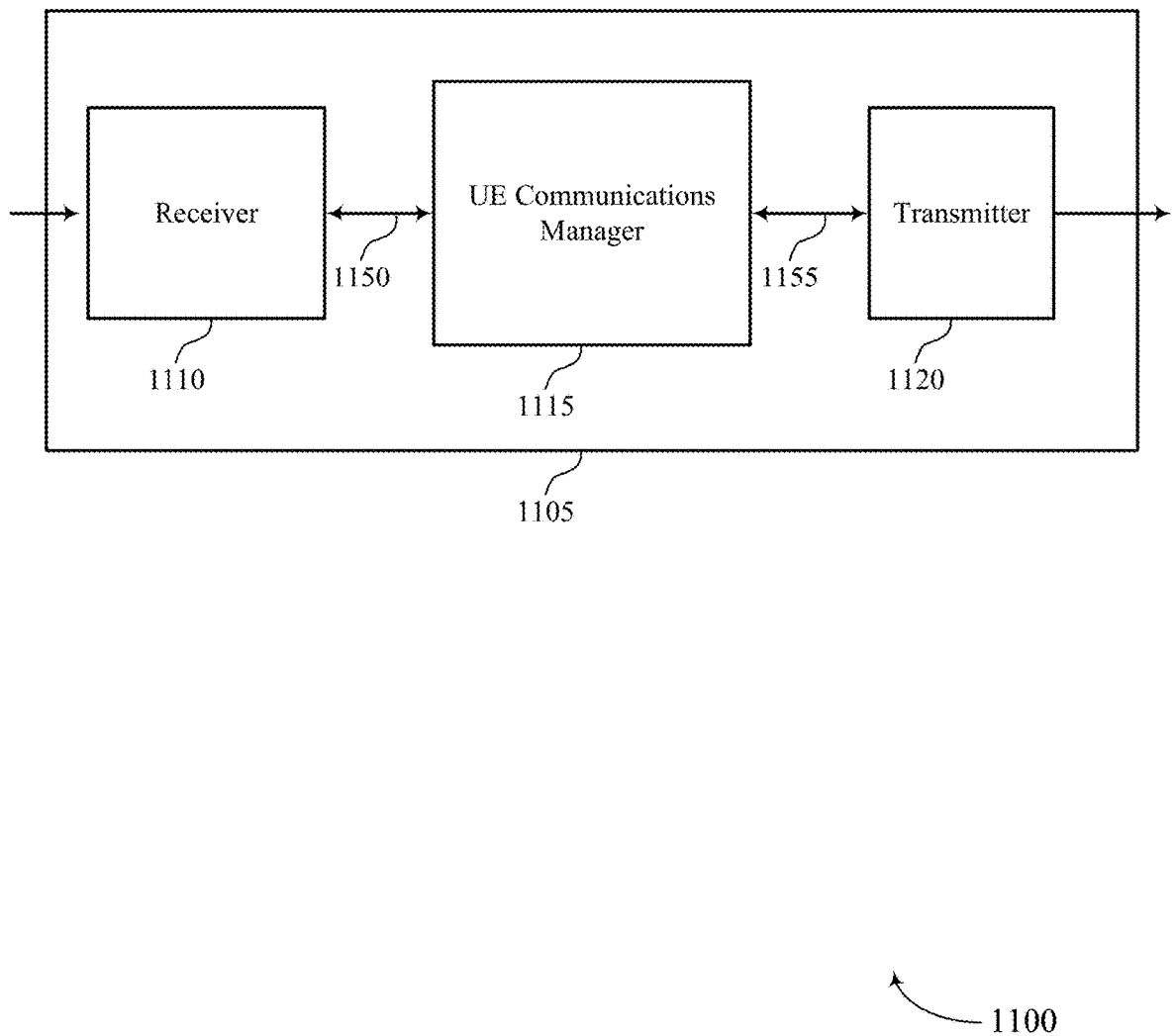
FIGS. 11 through 13 show block diagrams of a device that supports discontinuous scheduling in accordance with aspects of the present disclosure.

FIG. 11 shows a block diagram 1100 of a wireless device 1105 that supports discontinuous scheduling in accordance with aspects of the present disclosure. Wireless device 1105 may be an example of aspects of a user equipment (UE) 115 as described herein. Wireless device 1105 may include receiver 1110, UE communications manager 1115, and transmitter 1120. Wireless device 1105 may also include a processor. Each of these components may be in communication with one another (e.g., via one or more buses).

Receiver 1110 may receive information such as packets, user data, or control information associated with various information channels (e.g., control channels, data channels, and information related to discontinuous scheduling, etc.). Information may be passed on to other components of the device. The receiver 1110 may be communicatively coupled, and pass information, to the UE Communications manager via link 1150. The receiver 1110 may be an example of aspects of the transceiver 1435 described with reference to FIG. 14. The receiver 1110 may utilize a single antenna or a set of antennas.

UE communications manager 1115 may be an example of aspects of the UE communications manager 1415 described with reference to FIG. 14.

UE communications manager 1115 and/or at least some of its various sub-components may be implemented in hardware, software executed by a processor, firmware, or any combination thereof. If implemented in software executed by a processor, the functions of the UE communications manager 1115 and/or at least some of its various sub-components may be executed by a general-purpose processor, a digital signal processor (DSP), an application-specific integrated circuit (ASIC), an field-programmable gate array (FPGA) or other programmable logic device, discrete gate or transistor logic, discrete hardware components, or any combination thereof designed to perform the functions described in the present disclosure. The UE communications manager 1115 and/or at least some of its various sub-components may be physically located at various positions, including being distributed such that portions of functions are implemented at different physical locations by one or more physical devices. In some examples, UE communications manager 1115 and/or at least some of its various sub-components may be a separate and distinct component in accordance with various aspects of the present disclosure. In other examples, UE communications manager 1115 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

UE communications manager 1115 may monitor a control channel for a grant of resources of a communication channel over a set of aggregated transmission time intervals (TTIs), identify a location of an excluded TTI within the set of aggregated TTIs, and communicate via the resources of the communication channel over at least a subset of the set of aggregated TTIs based on the grant and the identified location of the excluded TTI. The UE communications manager 1115 may be communicatively coupled, and pass information, to the transmitter 1120.

Transmitter 1120 may transmit signals generated by other components of the device. In some examples, the transmitter 1120 may be collocated with a receiver 1110 in a transceiver module. For example, the transmitter 1120 may be an example of aspects of the transceiver 1435 described with reference to FIG. 14. The transmitter 1120 may be communicatively coupled with, and receive information from, the UE Communications manager via link 1155. The transmitter 1120 may utilize a single antenna or a set of antennas.

Figure 12:
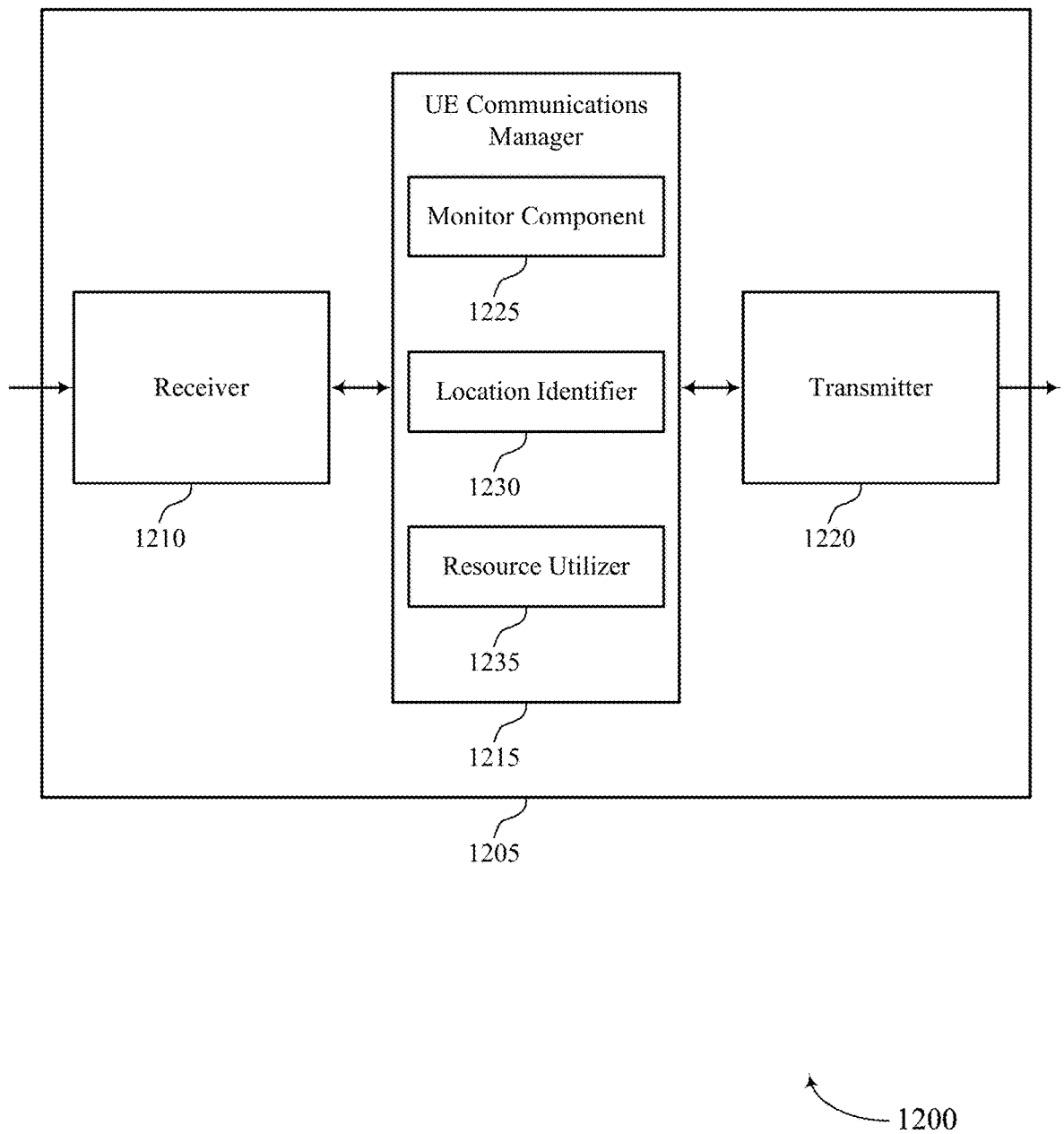

FIG. 12 shows a block diagram 1200 of a wireless device 1205 that supports discontinuous scheduling in accordance with aspects of the present disclosure. Wireless device 1205 may be an example of aspects of a wireless device 1105 or a UE 115 as described with reference to FIG. 11. Wireless device 1205 may include receiver 1210, UE communications manager 1215, and transmitter 1220. Wireless device 1205 may also include a processor. Each of these components may be in communication with one another (e.g., via one or more buses).

Receiver 1210 may receive information such as packets, user data, or control information associated with various information channels (e.g., control channels, data channels, and information related to discontinuous scheduling, etc.).

Information may be passed on to other components of the device. The receiver 1210 may be an example of aspects of the transceiver 1435 described with reference to FIG. 14. The receiver 1210 may utilize a single antenna or a set of antennas.

UE communications manager 1215 may be an example of aspects of the UE communications manager 1415 described with reference to FIG. 14.

UE communications manager 1215 may also include monitor component 1225, location identifier 1230, and resource utilizer 1235.

Monitor component 1225 may monitor a control channel for a grant of resources of a communication channel over a set of aggregated transmission time intervals (TTIs). In some cases, the grant includes a bit sequence identifying the set of aggregated TTIs. In some cases, the grant includes an index that corresponds to one of a set configurations for the set of aggregated TTIs. In some cases, at least some of the set of aggregated TTIs are non-contiguous in time.

Location identifier 1230 may identify a location of an excluded TTI within the set of aggregated TTIs.

Resource utilizer 1235 may communicate via the resources of the communication channel over at least a subset of the set of aggregated TTIs based on the grant and the identified location of the excluded TTI, receive a first portion of a data transmission of the first TTI in the first set of symbols via a first receive beam associated with the first transmit beam and a second portion of the data transmission of the first TTI in the second set of symbols via a second receive beam associated with the second transmit beam, and transmit the channel state information (CSI) and at least a portion of the multi-TTI acknowledgment transmission within the updated location of the acknowledgment TTI. In some cases, communicating via the resources of the communication channel includes: identifying a first set of symbols of the first TTI associated with a synchronization signal to be transmitted via a first transmit beam and a second set of symbols of the first TTI to be transmitted via a second transmit beam.

Transmitter 1220 may transmit signals generated by other components of the device. In some examples, the transmitter 1220 may be collocated with a receiver 1210 in a transceiver module. For example, the transmitter 1220 may be an example of aspects of the transceiver 1435 described with reference to FIG. 14. The transmitter 1220 may utilize a single antenna or a set of antennas.

Figure 13:
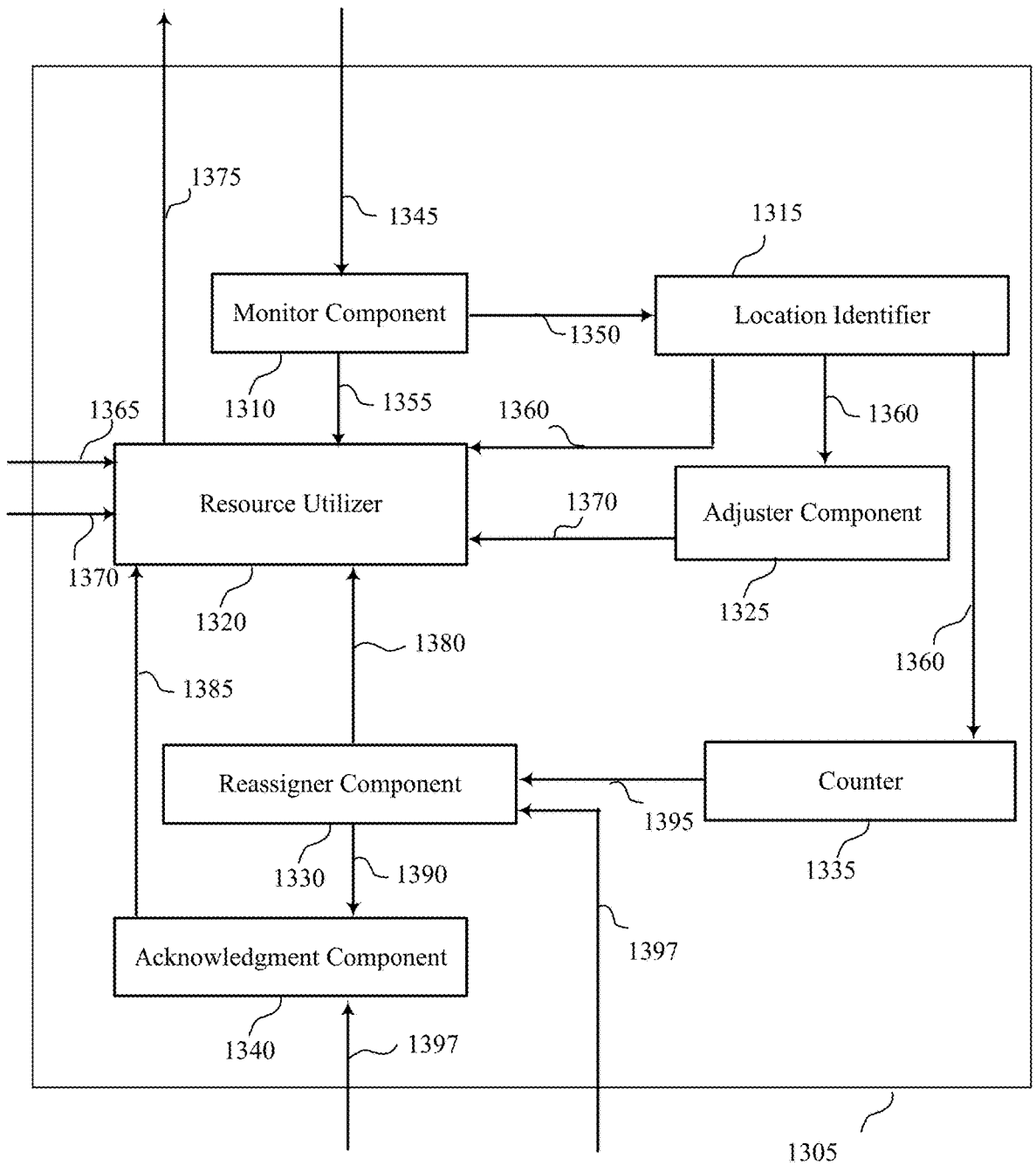

FIG. 13 shows a block diagram 1300 of a UE communications manager 1305 that supports discontinuous scheduling in accordance with aspects of the present disclosure. The UE communications manager 1305 may be an example of aspects of a UE communications manager 1115, a UE communications manager 1215, or a UE communications manager 1415 described with reference to FIGS. 11, 12, and 14.

UE communications manager 1305 may receive information from a receiver (e.g., receiver 1110, receiver 1210, or transceiver 1435 in FIGS. 11, 12, and 14, respectively), and may direct the received information to one or more components of UE communications manager 1305. Based at least in part on the information, UE communications manager 1305 may monitor a control channel for a grant of resources of a communication channel over a plurality of aggregated TTIs, identify a location of an excluded TTI within the plurality of aggregated TTIs, and communicate via the resources of the communication channel over at least a subset of the plurality of aggregated TTIs based at least in part on the grant and the identified location of the excluded TTI. UE communications manager 1305 may communicate via the resources of the communication channel by transmitting information via a transmitter (e.g., transmitter 1120, transmitter 1220, or transceiver 1435 in FIGS. 11, 12, and 14, respectively).

The UE communications manager 1305 may include monitor component 1310, location identifier 1315, resource utilizer 1320, adjuster component 1325, reassigner component 1330, counter 1335, and acknowledgment component 1340. Each of these modules may communicate, directly or indirectly, with one another (e.g., via one or more buses).

Monitor component 1310 may monitor a control channel for a grant of resources of a communication channel over a set of aggregated transmission time intervals (TTIs). In some cases, the grant includes a bit sequence identifying the set of aggregated TTIs. In some cases, the grant includes an index that corresponds to one of a set configurations for the set of aggregated TTIs. In some cases, at least some of the set of aggregated TTIs are non-contiguous in time.

Monitor component 1310 may receive, via receiver 1110, 1210, or 1435, a grant of resources 1345 from a base station 105. In some cases, monitor component 1310 may obtain the bit sequence and/or the index from the grant of resources 1345, and may pass, via an electrical connection, TTI information 1350 to location identifier 1315. TTI information 1350 may include an indication of the set of aggregated TTIs and/or an indication of the configuration of the set of aggregated TTIs. In some cases, monitor component 1310 may pass, via electrical connection, an indication 1355 of the grant of resources 1345 to resource utilizer 1320.

Location identifier 1315 may receive TTI information 1350 from monitor component 1310 and, based on the received TTI information 1350, identify a location of an excluded TTI within the set of aggregated TTIs. Location identifier 1315 may pass, via an electrical connection, the identified location 1360 of the excluded TTI to resource utilizer 1320, adjuster component 1325, and/or counter 1335.

Adjuster component 1325 may receive the identified location 1360 of the excluded TTI, adjust an end TTI for the set of aggregated TTIs based on the location of the excluded TTI, and adjust a TTI number for the set of aggregated TTIs based on the location of the excluded TTI. In some cases, adjuster component 1325 may pass, via an electrical connection, an indication of the adjusted end TTI 1370 to resource utilizer 1320.

Counter 1335 may receive the identified location 1360 of the excluded TTI and may maintain a TTI count of communicated TTIs of the set of aggregated TTIs based at least in part on the excluded TTI in the TTI count. In some cases, counter 1335 may pass, via an electrical connection, the TTI count 1395 to reassigner component 1330.

Reassigner component 1330 may receive, via receiver 1110, 1210, or 1435, a TTI reassignment indication 1390 reassigning at least a portion of a first TTI of the set of aggregated TTIs. Reassigner component 1330 may process the TTI reassignment indication, determine that the TTI reassignment indication is received after a beginning of transmission of a multi-TTI acknowledgment transmission, and adjust TTIs included in the set of aggregated TTIs based on the TTI reassignment indication.

In some examples, reassigner component 1330 may determine a location of the first TTI within the set of aggregated TTIs, and shift a subset of the set of aggregated TTIs, that occurs after the first TTI, back by at least one TTI based on the determined location of the first TTI. In some cases, reassigner component 1330 may determine that a location of an acknowledgment TTI has been changed to an updated location based on adjusting the TTIs included in the set of aggregated TTIs. In some examples, reassigner component 1330 may determine that the at least the portion of the first TTI is being punctured, determine that the TTI reassignment indication is received after a beginning of a multi-TTI acknowledgment transmission, and cancel a remainder of the multi-TTI acknowledgment transmission. In some examples, reassigner component 1330 may determine that the TTI reassignment indication is received after a beginning of transmission of a multi-TTI acknowledgment transmission.

Reassigner component 1330 may determine that a location of an acknowledgment TTI has changed to an updated location that overlaps with a TTI in which CSI is scheduled for transmission. In some cases, determining that the location of the acknowledgment TTI has changed includes: determining that the CSI is scheduled to be transmitted within one of the adjusted set of aggregated TTIs. In some cases, determining that the location of the acknowledgment TTI has changed includes: determining that the updated location of the acknowledgment TTI is in a same TTI as a TTI scheduled to transport the CSI. In some cases, reassigner component 1330 may pass, via an electrical connection, adjusted TTI information 1380 to resource utilizer 1320.

Acknowledgement component 1340 may receive, via receiver 1110, 1210, or 1435, the TTI reassignment indication 1390 reassigning at least a portion of a first TTI of the set of aggregated TTIs. Acknowledgment component 1340 may communicate an acknowledgment of the TTI reassignment indication 1390 prior to a beginning TTI of the set of aggregated TTIs. In some examples, acknowledgment component 1340 may communicate a merged feedback message that includes CSI and acknowledgement data within the updated location, where the merged feedback message includes at least a portion of the multi-TTI acknowledgment transmission. In some cases, acknowledgement component 1340 may pass, via an electrical connection, the merged feedback message 1385 to resource utilizer 1320.

Resource utilizer 1320 may receive the indication 1355 of the grant of resources 1345, the identified location 1360 of the excluded TTI, the merged feedback message 1385, and the adjusted TTI information 1380. Resource utilizer 1320 may communicate via the resources of the communication channel over at least a subset of the set of aggregated TTIs based on the grant (e.g., based on the indication 1355 of the grant of resources 1345) and the identified location 1360 of the excluded TTI. Resource utilizer 1320 may receive, via receiver 1110, 1210, or 1435, a first portion of a data transmission 1365 of the first TTI in the first set of symbols via a first receive beam associated with the first transmit beam. Resource utilizer 1320 may receive, via receiver 1110, 1210, or 1435, a second portion of the data transmission 1368 of the first TTI in the second set of symbols via a second receive beam associated with the second transmit beam.

Resource utilizer 1320 may transmit, via transmitter 1120, 1220, or transceiver 1435, the CSI and at least a portion of the multi-TTI acknowledgment transmission 1375 (e.g., based on the merged feedback message 1385) within the updated location of the acknowledgment TTI. In some cases, communicating via the resources of the communication channel includes identifying a first set of symbols of the first TTI associated with a synchronization signal to be transmitted via a first transmit beam and a second set of symbols of the first TTI to be transmitted via a second transmit beam.

Figure 14:
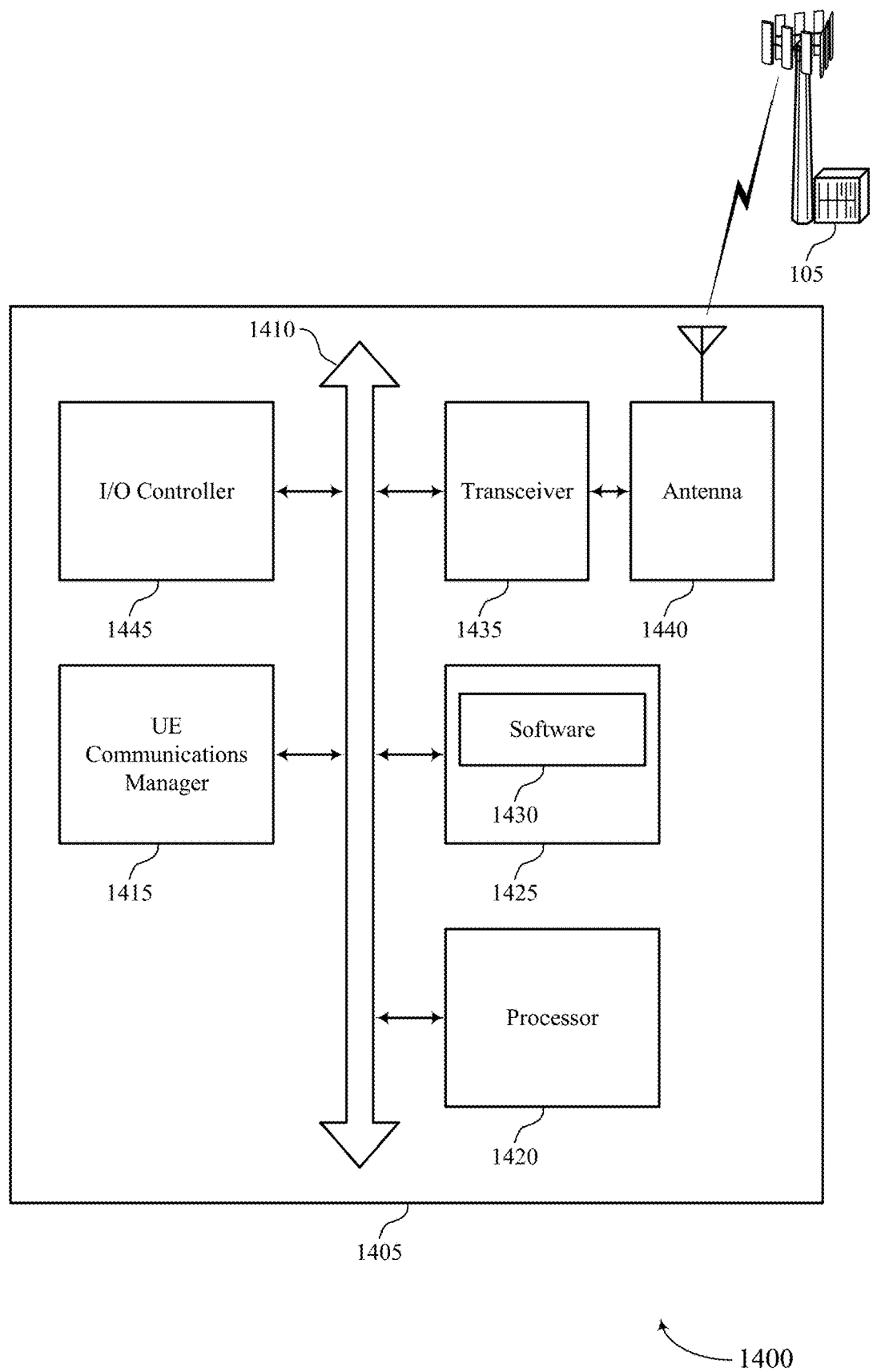
FIG. 14 illustrates a block diagram of a system including a UE that supports discontinuous scheduling in accordance with aspects of the present disclosure.

FIG. 14 shows a diagram of a system 1400 including a device 1405 that supports discontinuous scheduling in accordance with aspects of the present disclosure. Device 1405 may be an example of or include the components of wireless device 1105, wireless device 1205, or a UE 115 as described above, e.g., with reference to FIGS. 11 and 12. Device 1405 may include components for bi-directional voice and data communications including components for transmitting and receiving communications, including UE communications manager 1415, processor 1420, memory 1425, software 1430, transceiver 1435, antenna 1440, and I/O controller 1445. These components may be in electronic communication via one or more buses (e.g., bus 1410). Device 1405 may communicate wirelessly with one or more base stations 105.

Processor 1420 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 1420 may be configured to operate a memory array using a memory controller. In other cases, a memory controller may be integrated into processor 1420. Processor 1420 may be configured to execute computer-readable instructions stored in a memory to perform various functions (e.g., functions or tasks supporting discontinuous scheduling).

Memory 1425 may include random access memory (RAM) and read only memory (ROM). The memory 1425 may store computer-readable, computer-executable software 1430 including instructions that, when executed, cause the processor to perform various functions described herein. In some cases, the memory 1425 may contain, among other things, a basic input/output system (BIOS) which may control basic hardware or software operation such as the interaction with peripheral components or devices.

Software 1430 may include code to implement aspects of the present disclosure, including code to support discontinuous scheduling. Software 1430 may be stored in a non-transitory computer-readable medium such as system memory or other memory. In some cases, the software 1430 may not be directly executable by the processor but may cause a computer (e.g., when compiled and executed) to perform functions described herein.

Transceiver 1435 may communicate bi-directionally, via one or more antennas, wired, or wireless links as described above. For example, the transceiver 1435 may represent a wireless transceiver and may communicate bi-directionally with another wireless transceiver. The transceiver 1435 may also include a modem to modulate the packets and provide the modulated packets to the antennas for transmission, and to demodulate packets received from the antennas.

In some cases, the wireless device may include a single antenna 1440. However, in some cases the device may have more than one antenna 1440, which may be capable of concurrently transmitting or receiving multiple wireless transmissions.

I/O controller 1445 may manage input and output signals for device 1405. I/O controller 1445 may also manage peripherals not integrated into device 1405. In some cases, I/O controller 1445 may represent a physical connection or port to an external peripheral. In some cases, I/O controller 1445 may utilize an operating system such as iOS®, ANDROID®, MS-DOS®, MS-WINDOWS®, OS/2®, UNIX®, LINUX®, or another known operating system. In other cases, I/O controller 1445 may represent or interact with a modem, a keyboard, a mouse, a touchscreen, or a similar device. In some cases, I/O controller 1445 may be implemented as part of a processor. In some cases, a user may interact with device 1405 via I/O controller 1445 or via hardware components controlled by I/O controller 1445.

Figure 15:
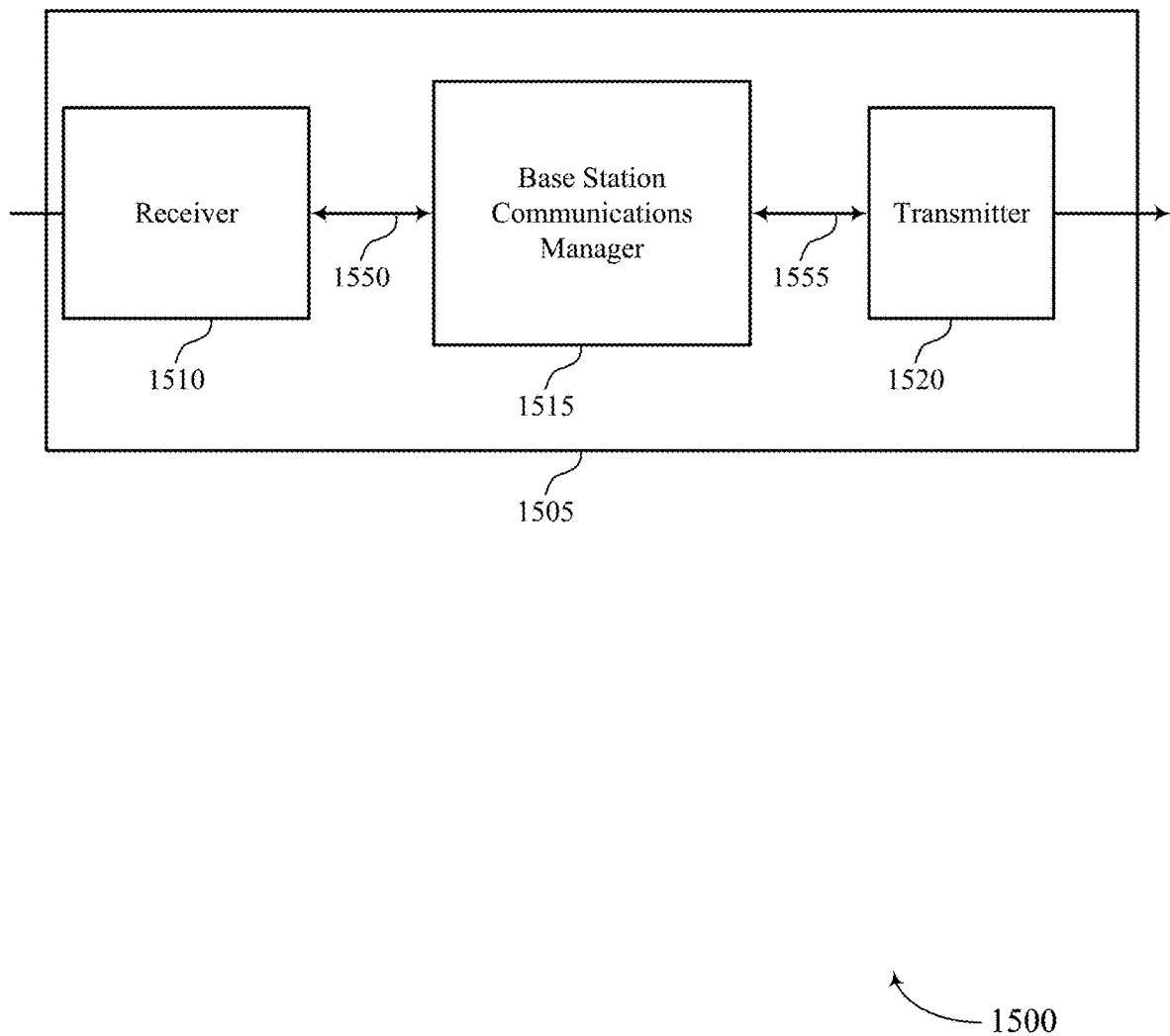
FIGS. 15 through 17 show block diagrams of a device that supports discontinuous scheduling in accordance with aspects of the present disclosure.

FIG. 15 shows a block diagram 1500 of a wireless device 1505 that supports discontinuous scheduling in accordance with aspects of the present disclosure. Wireless device 1505 may be an example of aspects of a base station 105 as described herein. Wireless device 1505 may include receiver 1510, base station communications manager 1515, and transmitter 1520. Wireless device 1505 may also include a processor. Each of these components may be in communication with one another (e.g., via one or more buses).

Receiver 1510 may receive information such as packets, user data, or control information associated with various information channels (e.g., control channels, data channels, and information related to discontinuous scheduling, etc.). Information may be passed on to other components of the device. The receiver 1510 may be communicatively coupled, and pass information, to the UE Communications manager via link 1550. The receiver 1510 may be an example of aspects of the transceiver 1835 described with reference to FIG. 18. The receiver 1510 may utilize a single antenna or a set of antennas.

Base station communications manager 1515 may be an example of aspects of the base station communications manager 1815 described with reference to FIG. 18.

Base station communications manager 1515 and/or at least some of its various sub-components may be implemented in hardware, software executed by a processor, firmware, or any combination thereof. If implemented in software executed by a processor, the functions of the base station communications manager 1515 and/or at least some of its various sub-components may be executed by a general-purpose processor, a DSP, an ASIC, an FPGA or other programmable logic device, discrete gate or transistor logic, discrete hardware components, or any combination thereof designed to perform the functions described in the present disclosure. The base station communications manager 1515 and/or at least some of its various sub-components may be physically located at various positions, including being distributed such that portions of functions are implemented at different physical locations by one or more physical devices. In some examples, base station communications manager 1515 and/or at least some of its various sub-components may be a separate and distinct component in accordance with various aspects of the present disclosure. In other examples, base station communications manager 1515 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

Base station communications manager 1515 may transmit, to a UE, a grant of resources of a communication channel over a set of aggregated transmission time intervals (TTIs), identify a location of an excluded TTI within the set of aggregated TTIs, and communicate with the UE via the resources of the communication channel over at least a subset of the set of aggregated TTIs based on the grant and the location of the excluded TTI. The base station communications manager 1515 may be communicatively coupled, and pass information, to the transmitter 1520.

Transmitter 1520 may transmit signals generated by other components of the device. In some examples, the transmitter 1520 may be collocated with a receiver 1510 in a transceiver module. For example, the transmitter 1520 may be an example of aspects of the transceiver 1835 described with reference to FIG. 18. The transmitter 1520 may be communicatively coupled with, and receive information from, the UE Communications manager via link 1555. The transmitter 1520 may utilize a single antenna or a set of antennas.

Figure 16:
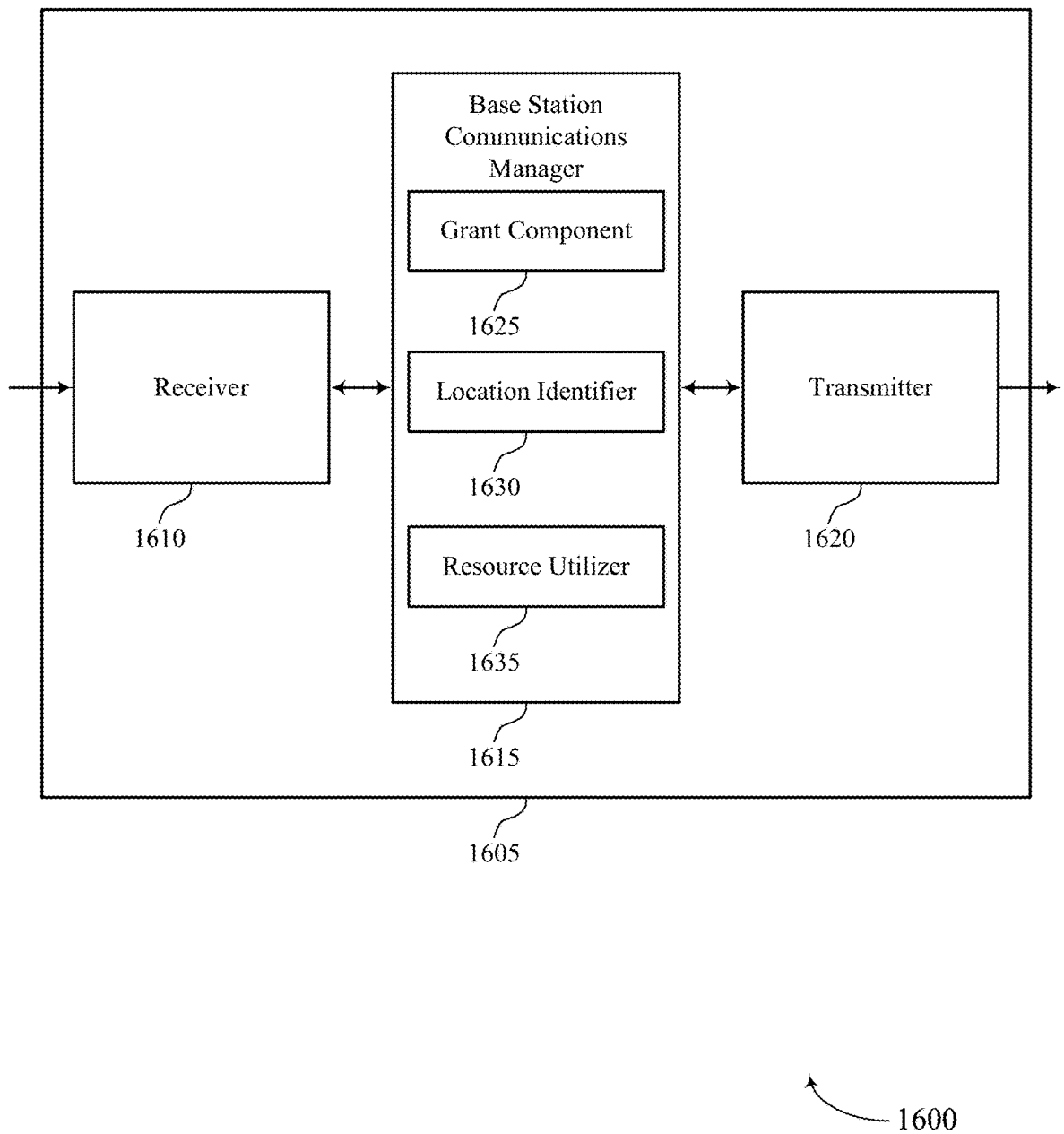

FIG. 16 shows a block diagram 1600 of a wireless device 1605 that supports discontinuous scheduling in accordance with aspects of the present disclosure. Wireless device 1605 may be an example of aspects of a wireless device 1505 or a base station 105 as described with reference to FIG. 15. Wireless device 1605 may include receiver 1610, base station communications manager 1615, and transmitter 1620. Wireless device 1605 may also include a processor. Each of these components may be in communication with one another (e.g., via one or more buses).

Receiver 1610 may receive information such as packets, user data, or control information associated with various information channels (e.g., control channels, data channels, and information related to discontinuous scheduling, etc.). Information may be passed on to other components of the device. The receiver 1610 may be an example of aspects of the transceiver 1835 described with reference to FIG. 18. The receiver 1610 may utilize a single antenna or a set of antennas.

Base station communications manager 1615 may be an example of aspects of the base station communications manager 1815 described with reference to FIG. 18.

Base station communications manager 1615 may also include grant component 1625, location identifier 1630, and resource utilizer 1635.

Grant component 1625 may transmit, to a UE, a grant of resources of a communication channel over a set of aggregated transmission time intervals (TTIs). In some cases, the grant includes a bit sequence identifying the set of aggregated TTIs. In some cases, the grant includes an index that corresponds to one of a set configurations for the set of aggregated TTIs. In some cases, at least some of the set of aggregated TTIs are non-contiguous in time.

Location identifier 1630 may identify a location of an excluded TTI within the set of aggregated TTIs.

Resource utilizer 1635 may communicate with the UE via the resources of the communication channel over at least a subset of the set of aggregated TTIs based on the grant and the location of the excluded TTI, identify a first set of symbols of the first TTI associated with a synchronization signal to be transmitted via a first transmit beam and a second set of symbols of the first TTI to be transmitted via a second transmit beam, and transmit a first portion of a data transmission of the first TTI in the first set of symbols via the first transmit beam and a second portion of the data transmission of the first TTI in the second set of symbols via the second transmit beam.

Transmitter 1620 may transmit signals generated by other components of the device. In some examples, the transmitter 1620 may be collocated with a receiver 1610 in a transceiver module. For example, the transmitter 1620 may be an example of aspects of the transceiver 1835 described with reference to FIG. 18. The transmitter 1620 may utilize a single antenna or a set of antennas.

Figure 17:
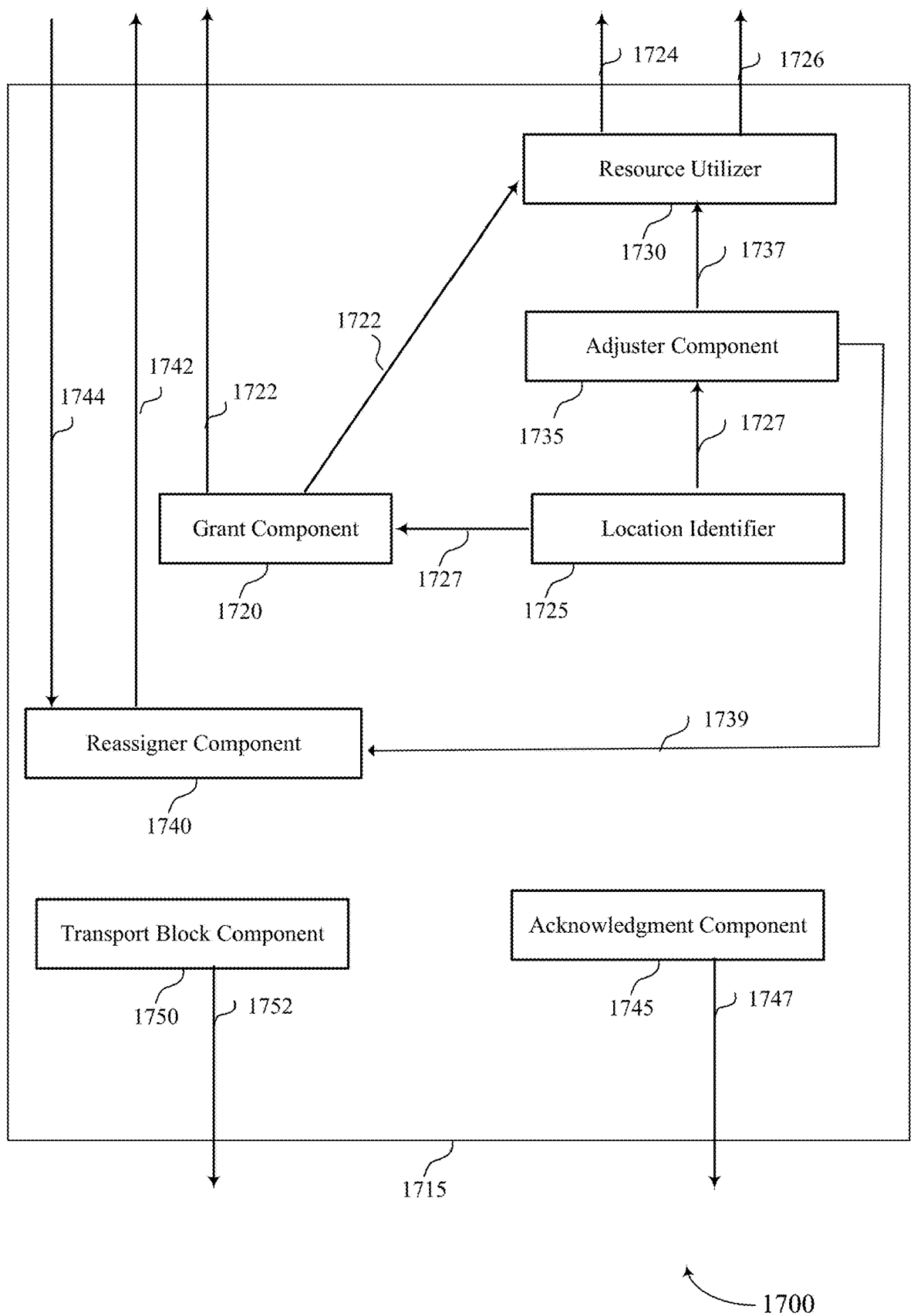

FIG. 17 shows a block diagram 1700 of a base station communications manager 1705 that supports discontinuous scheduling in accordance with aspects of the present disclosure. The base station communications manager 1705 may be an example of aspects of a base station communications manager 1515, 1615, or 1815 described with reference to FIGS. 15, 16, and 18.

The base station communications manager 1705 may receive information from a receiver (e.g., receiver 1510, receiver 1610, or transceiver 1835 in FIGS. 15, 16, and 18, respectively), and may direct the received information to one or more components of base station communications manager 1705. Based at least in part on the information, base station communications manager 1705 may transmit, to a UE, a grant of resources of a communication channel over a plurality of aggregated TTIs, identify a location of an excluded TTI within the plurality of aggregated TTIs, and communicate with the UE via the resources of the communication channel over at least a subset of the plurality of aggregated TTIs based at least in part on the grant and the location of the excluded TTI. Base station communications manager 1705 may transmit information to the UE via a transmitter (e.g., transmitter 1520, transmitter 1620, or transceiver 1835 in FIGS. 15, 16, and 18, respectively).

The base station communications manager 1705 may include grant component 1710, resource utilizer 1715, adjuster component 1720, location identifier 1725, acknowledgment component 1730, transport block component 1735, and reassigner component 1740. Each of these modules may communicate, directly or indirectly, with one another (e.g., via one or more buses).

Grant component 1710 may receive a request for resources 1760 from a UE and transmit (e.g., via transmitter 1520, transmitter 1620, or transceiver 1835), to the UE, a grant 1755 of resources of a communication channel over a set of aggregated transmission time intervals (TTIs). In some cases, the grant 1755 includes a bit sequence identifying the set of aggregated TTIs. In some cases, the grant 1755 includes an index that corresponds to one of a set configurations for the set of aggregated TTIs. In some cases, at least some of the set of aggregated TTIs are non-contiguous in time. In some cases, grant component 1710 may pass, via an electrical connection, the grant 1755 to resource utilizer 1715 and location identifier 1725. In some cases, grant component 1710 may pass, via an electrical connection, the request for resources 1760 to transport block component 1735 and location identifier 1725.

Location identifier 1725 may receive the request for resources 1760 and identify a location of an excluded TTI within the set of aggregated TTIs. In some cases, location identifier 1725 may pass, via an electrical connection, the identified location 1790 of the excluded TTI to grant component 1710, resource utilizer 1715, and adjuster component 1720.

Resource utilizer 1715 may receive the grant 1755 and the identified location 1790 of the excluded TTI and may communicate with the UE via the resources of the communication channel over at least a subset of the set of aggregated TTIs based on the grant 1755 and the identified location 1790 of the excluded TTI. Resource utilizer 1715 may identify a first set of symbols of the first TTI associated with a synchronization signal to be transmitted via a first transmit beam and a second set of symbols of the first TTI to be transmitted via a second transmit beam, and transmit (e.g., via transmitter 1520, transmitter 1620, or transceiver 1835) a first portion of a data transmission 1765 of the first TTI in the first set of symbols via the first transmit beam and a second portion of the data transmission 1770 of the first TTI in the second set of symbols via the second transmit beam. Resource utilizer 1715 may receive and make scheduling decisions based on merged feedback message 1775 from the acknowledgment component 1730.

Adjuster component 1720 may receive the location 1790 of the excluded TTI, and may adjust an end TTI for the set of aggregated TTIs based on the location of the excluded TTI, adjust a TTI number for the set of aggregated TTIs based on the location of the excluded TTI, adjust TTIs included in the set of aggregated TTIs based on the TTI reassignment indication, determine a location of the first TTI within the set of aggregated TTIs, and shift a subset of the set of aggregated TTIs, that occurs after the first TTI, back by at least one TTI based on the determined location. In some cases, adjuster component 1720 may pass, via an electrical connection, an indication 1780 of the adjusted end TTI to resource utilizer 1715. In some cases, adjuster component 1720 may pass, via an electrical connection, an indication 1785 of the location of the first TTI to reassigner component 1740.

Reassigner component 1740 may generate a TTI reassignment indication 1750 reassigning at least a portion of a first TTI of the set of aggregated TTIs, transmit the TTI reassignment indication 1750 to the UE (e.g., via transmitter 1520, transmitter 1620, or transceiver 1835), and determine that the at least the portion of the first TTI is being punctured. In some cases, reassigner component 1740 may receive, from the UE, an indication 1745 of a capability of the UE. In some cases, generating the TTI reassignment indication includes: generating the TTI reassignment indication based on determining that a capability of the UE (e.g., based on the indication 1745 of the capability) satisfies a threshold. In some cases, determining that the capability of the UE satisfies the threshold includes: determining that a response time of the UE satisfies the threshold. In some cases, reassigner component 1740 may pass, via an electrical connection, the TTI reassignment indication 1750 to acknowledgement component 1730.

Acknowledgment component 1730 may receive a merged feedback message that includes CSI and acknowledgement data and receive an acknowledgment of the TTI reassignment indication 1750 prior to a beginning TTI of the set of aggregated TTIs. In some cases, acknowledgement component 1730 may pass, via an electrical connection, the merged feedback message 1775 to the resource utilizer 1715.

Transport block component 1735 may receive the request for resources 1760 from the grant component 1710 and communicate a transport block size that excludes the first TTI from a calculation of the transport block size. In some cases, transport block component 1735 may transmit the transport block size 1795 to a UE (e.g., via transmitter 1520, transmitter 1620, or transceiver 1835).

Figure 18:
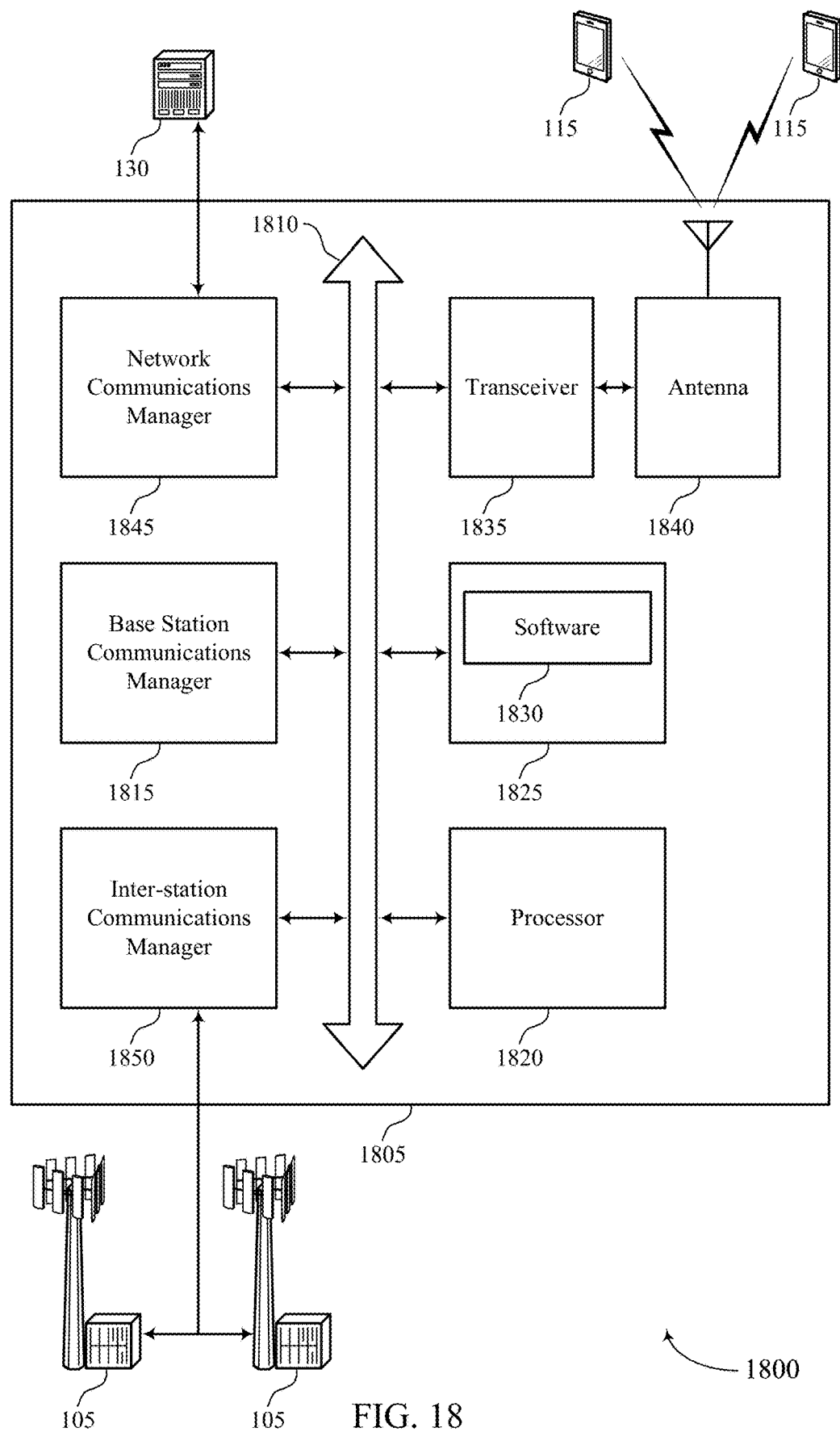
FIG. 18 illustrates a block diagram of a system including a base station that supports discontinuous scheduling in accordance with aspects of the present disclosure.

FIG. 18 shows a diagram of a system 1800 including a device 1805 that supports discontinuous scheduling in accordance with aspects of the present disclosure. Device 1805 may be an example of or include the components of base station 105 as described above, e.g., with reference to FIG. 1. Device 1805 may include components for bi-directional voice and data communications including components for transmitting and receiving communications, including base station communications manager 1815, processor 1820, memory 1825, software 1830, transceiver 1835, antenna 1840, network communications manager 1845, and inter-station communications manager 1850. These components may be in electronic communication via one or more buses (e.g., bus 1810). Device 1805 may communicate wirelessly with one or more UEs 115.

Processor 1820 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, processor 1820 may be configured to operate a memory array using a memory controller. In other cases, a memory controller may be integrated into processor 1820. Processor 1820 may be configured to execute computer-readable instructions stored in a memory to perform various functions (e.g., functions or tasks supporting discontinuous scheduling).

Memory 1825 may include RAM and ROM. The memory 1825 may store computer-readable, computer-executable software 1830 including instructions that, when executed, cause the processor to perform various functions described herein. In some cases, the memory 1825 may contain, among other things, a BIOS which may control basic hardware or software operation such as the interaction with peripheral components or devices.

Software 1830 may include code to implement aspects of the present disclosure, including code to support discontinuous scheduling. Software 1830 may be stored in a non-transitory computer-readable medium such as system memory or other memory. In some cases, the software 1830 may not be directly executable by the processor but may cause a computer (e.g., when compiled and executed) to perform functions described herein.

Transceiver 1835 may communicate bi-directionally, via one or more antennas, wired, or wireless links as described above. For example, the transceiver 1835 may represent a wireless transceiver and may communicate bi-directionally with another wireless transceiver. The transceiver 1835 may also include a modem to modulate the packets and provide the modulated packets to the antennas for transmission, and to demodulate packets received from the antennas.

In some cases, the wireless device may include a single antenna 1840. However, in some cases the device may have more than one antenna 1840, which may be capable of concurrently transmitting or receiving multiple wireless transmissions.

Network communications manager 1845 may manage communications with the core network (e.g., via one or more wired backhaul links). For example, the network communications manager 1845 may manage the transfer of data communications for client devices, such as one or more UEs 115.

Inter-station communications manager 1850 may manage communications with other base station 105, and may include a controller or scheduler for controlling communications with UEs 115 in cooperation with other base stations 105. For example, the inter-station communications manager 1850 may coordinate scheduling for transmissions to UEs 115 for various interference mitigation techniques such as beamforming or joint transmission. In some examples, inter-station communications manager 1850 may provide an X2 interface within an Long Term Evolution (LTE)/LTE-A wireless communication network technology to provide communication between base stations 105.

Figure 19:
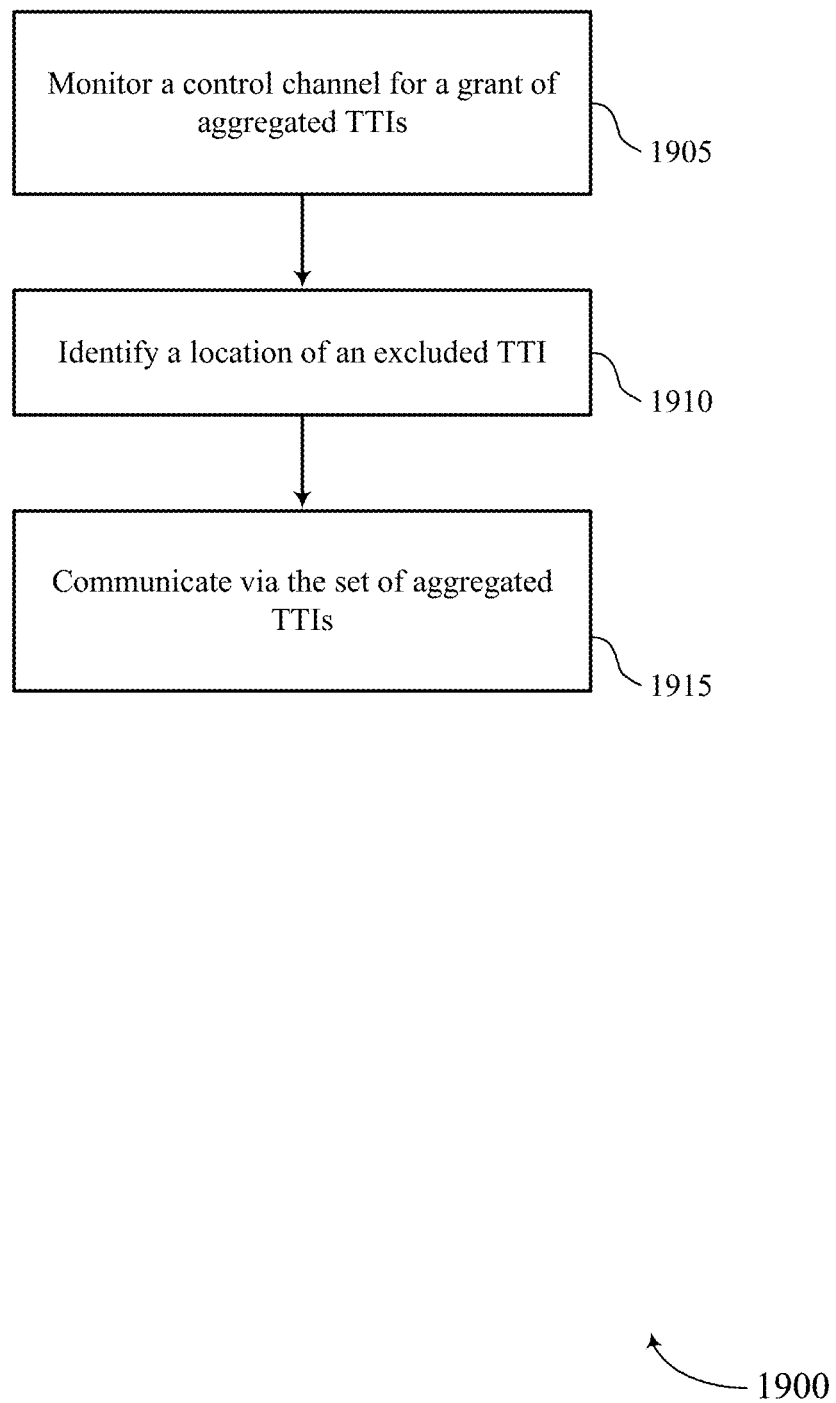
FIGS. 19 through 23 illustrate methods for discontinuous scheduling in accordance with aspects of the present disclosure.

FIG. 19 shows a flowchart illustrating a method 1900 for discontinuous scheduling in accordance with aspects of the present disclosure. The operations of method 1900 may be implemented by a UE 115 or its components as described herein. For example, the operations of method 1900 may be performed by a UE communications manager as described with reference to FIGS. 11 through 14. In some examples, a UE 115 may execute a set of codes to control the functional elements of the device to perform the functions described below. Additionally or alternatively, the UE 115 may perform aspects of the functions described below using special-purpose hardware.

At block 1905 the UE 115 may monitor a control channel for a grant of resources of a communication channel over a plurality of aggregated transmission time intervals (TTIs). In some examples, UE 115 may monitor the control channel using a receiver that may detect an incoming signal, e.g., a grant. The operations of block 1905 may be performed according to the methods described herein. In some examples, the UE 115 may identify time-frequency resources over which the control channel is transmitted, demodulate a transmission over those time-frequency resources, decode the demodulated transmission to obtain bits that indicate the downlink transmission. In certain examples, aspects of the operations of block 1905 may be performed by a monitor component as described with reference to FIGS. 11 through 14.

At block 1910 the UE 115 may identify a location of an excluded TTI within the plurality of aggregated TTIs. In some examples, the UE 115 may identify the location of an excluded TTI based on information included in the grant received at block 1905, or based on configuration information received within RRC signaling. The operations of block 1910 may be performed according to the methods described herein. In some examples, the UE 115 may receive, from the base station 105 via receiver 1110 or 1210, an indication of the location of the excluded TTI in a DCI or via RRC signaling. In certain examples, aspects of the operations of block 1910 may be performed by a location identifier as described with reference to FIGS. 11 through 14.

At block 1915 the UE 115 may communicate via the resources of the communication channel over at least a subset of the plurality of aggregated TTIs based at least in part on the grant and the identified location of the excluded TTI. In some examples, UE 115 may communicate by transmitting or receiving, using a transmitter or receiver as described in FIGS. 11-12, a signal using time-frequency resources associated with the communication channel. The operations of block 1915 may be performed according to the methods described herein. In some examples, the UE 115 may determine a set of aggregated TTIs corresponding to a grant based on a start TTI indication, and an end TTI indication or a TTI number indication. The UE 115 may identify in which TTIs resources have been allocated to the UE 115, and may communicate within the allocated resources and corresponding TTIs. In certain examples, aspects of the operations of block 1915 may be performed by a resource utilizer as described with reference to FIGS. 11 through 14.

Figure 20:
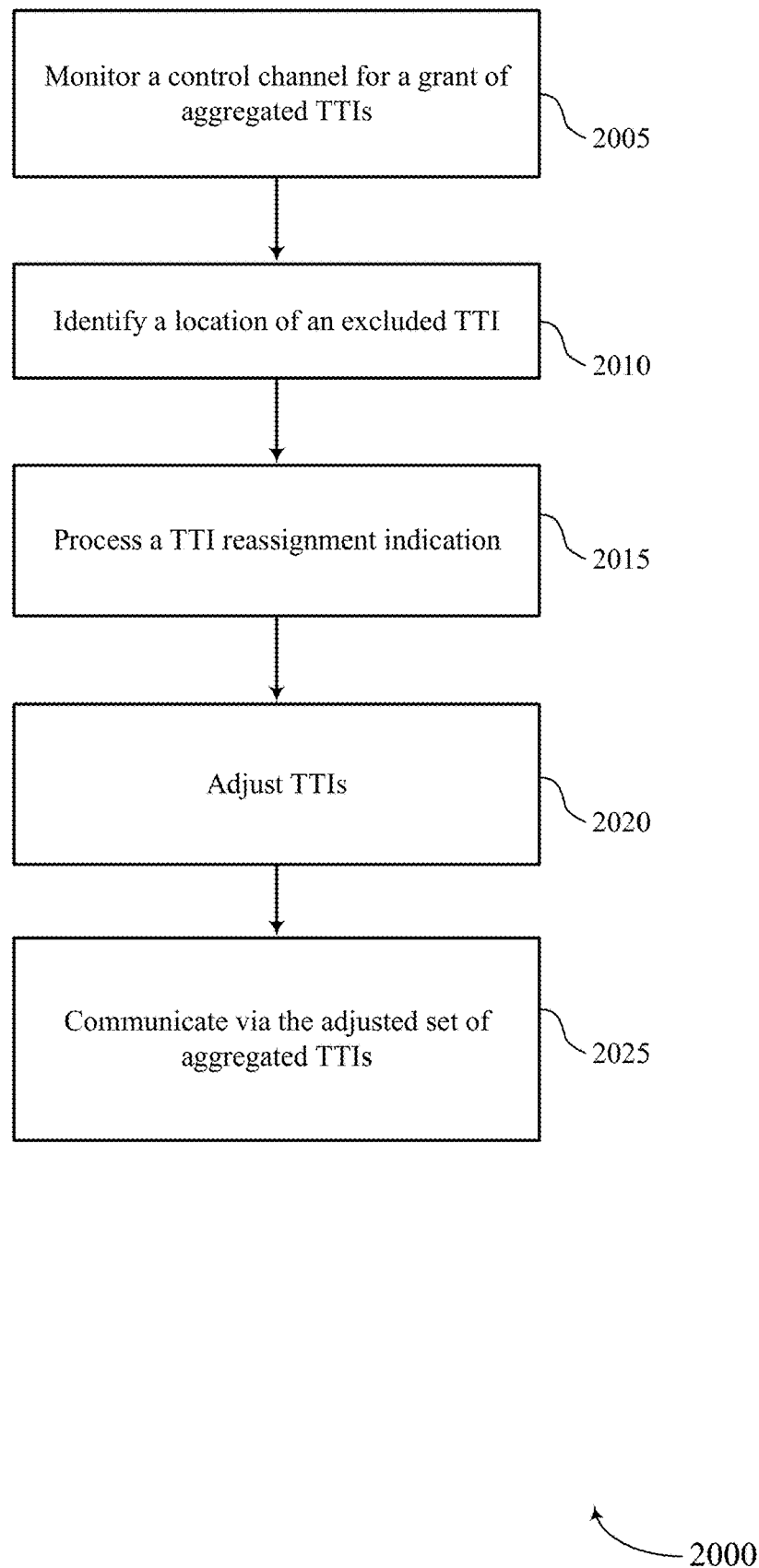

FIG. 20 shows a flowchart illustrating a method 2000 for discontinuous scheduling in accordance with aspects of the present disclosure. The operations of method 2000 may be implemented by a UE 115 or its components as described herein. For example, the operations of method 2000 may be performed by a UE communications manager as described with reference to FIGS. 11 through 14. In some examples, a UE 115 may execute a set of codes to control the functional elements of the device to perform the functions described below. Additionally or alternatively, the UE 115 may perform aspects of the functions described below using special-purpose hardware.

At block 2005 the UE 115 may monitor a control channel for a grant of resources of a communication channel over a plurality of aggregated transmission time intervals (TTIs). In some examples, UE 115 may monitor the control channel using a receiver that may detect an incoming signal, e.g., a grant. The operations of block 2005 may be performed according to the methods described herein. In some examples, the UE 115 may identify time-frequency resources over which the control channel is transmitted, demodulate a transmission over those time-frequency resources, decode the demodulated transmission to obtain bits that indicate the downlink transmission. In certain examples, aspects of the operations of block 2005 may be performed by a monitor component as described with reference to FIGS. 11 through 14.

At block 2010 the UE 115 may identify a location of an excluded TTI within the plurality of aggregated TTIs. In some examples, the UE 115 may identify the location of an excluded TTI based on information included in the grant received at block 1905, or based on configuration information received within RRC signaling. The operations of block 2010 may be performed according to the methods described herein. In some examples, the UE 115 may receive, from the base station 105 via receiver 1110 or 1210, an indication of a location of an excluded TTI in a DCI or via RRC signaling. In certain examples, aspects of the operations of block 2010 may be performed by a location identifier as described with reference to FIGS. 11 through 14.

At block 2015 the UE 115 may process a TTI reassignment indication reassigning at least a portion of a first TTI of the plurality of aggregated TTIs. In some examples, UE 115 may receive the TTI reassignment indication from a base station 105 via a receiver 1110 or 1210. UE 115 may process the TTI reassignment indication by identifying, based on the TTI reassignment indication, a TTI that is to be reassigned. The operations of block 2015 may be performed according to the methods described herein. In certain examples, aspects of the operations of block 2015 may be performed by a reassigner component as described with reference to FIGS. 11 through 14.

At block 2020 the UE 115 may adjust TTIs included in the plurality of aggregated TTIs by shifting a subset of the set of aggregated TTIs, that occurs after the first TTI, back by at least one TTI. The UE 115 may shift the subset of the set of aggregated TTIs by changing an index into the set of aggregated TTIs, for example. The operations of block 2020 may be performed according to the methods described herein. In some examples, the UE 115 may determine a set of aggregated TTIs corresponding to a grant, determine a location of a TTI within the grant being reassigned, and shift the subsequent TTIs in the set of aggregated TTIs by at least one TTI. In certain examples, aspects of the operations of block 2020 may be performed by a reassigner component as described with reference to FIGS. 11 through 14.

At block 2025 the UE 115 may communicate via the resources of the communication channel over at least a subset of the adjusted plurality of aggregated TTIs based at least in part on the grant and the identified location of the excluded TTI. In some examples, UE 115 may communicate by transmitting or receiving, using a transmitter or receiver as described in FIGS. 11-12, a signal using time-frequency resources associated with the communication channel. The operations of block 2025 may be performed according to the methods described herein. The UE 115 may, for example, communicate uplink data and/or receive downlink data within the allocated resources and corresponding TTIs. In certain examples, aspects of the operations of block 2025 may be performed by a resource utilizer as described with reference to FIGS. 11 through 14.

Figure 21:
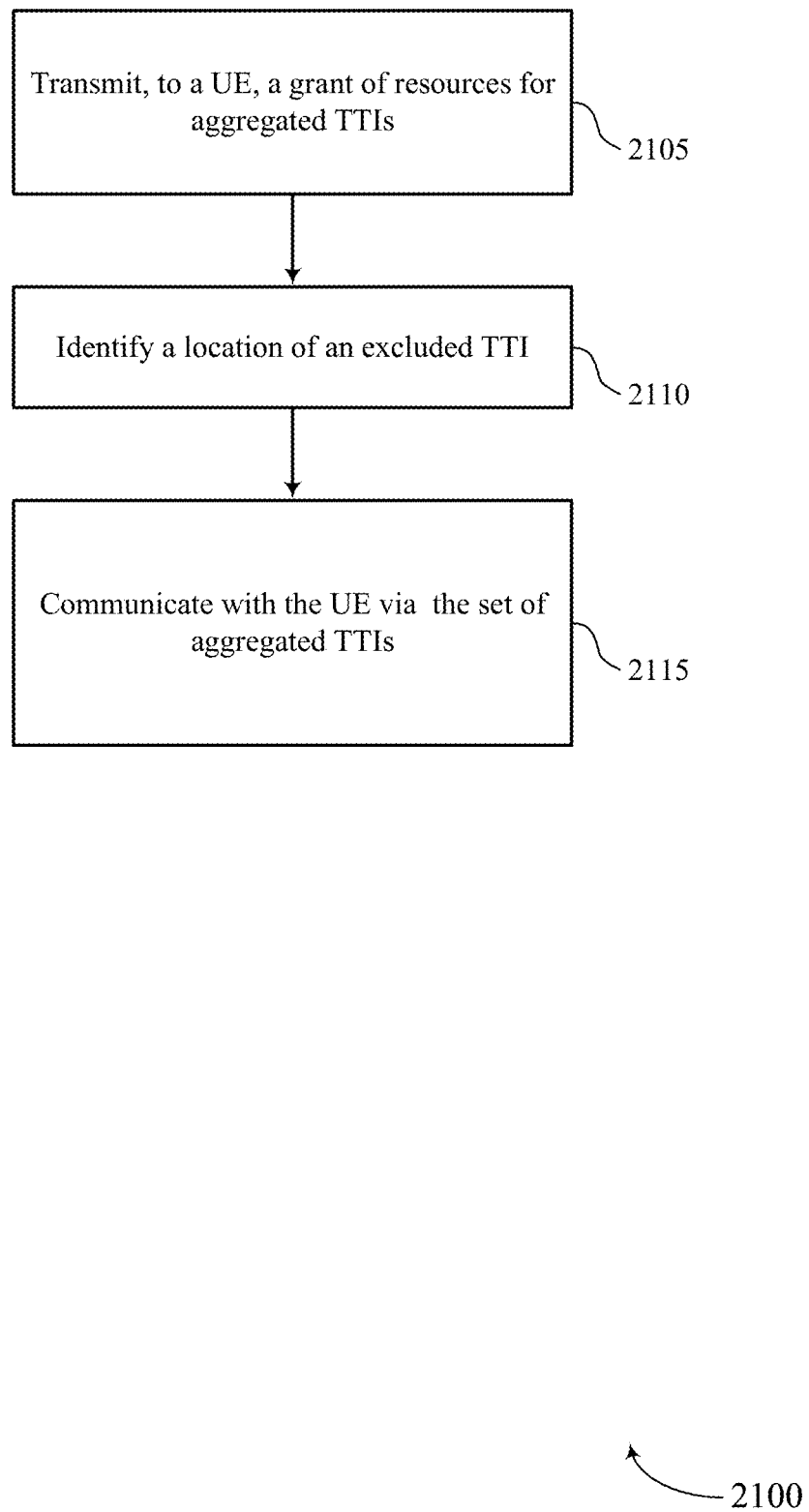

FIG. 21 shows a flowchart illustrating a method 2100 for discontinuous scheduling in accordance with aspects of the present disclosure. The operations of method 2100 may be implemented by a base station 105 or its components as described herein. For example, the operations of method 2100 may be performed by a base station communications manager as described with reference to FIGS. 15 through 18. In some examples, a base station 105 may execute a set of codes to control the functional elements of the device to perform the functions described below. Additionally or alternatively, the base station 105 may perform aspects of the functions described below using special-purpose hardware.

At block 2105 the base station 105 may transmit, to a user equipment (UE), a grant of resources of a communication channel over a plurality of aggregated transmission time intervals (TTIs). The base station may transmit the grant using a transmitter, for example. The operations of block 2105 may be performed according to the methods described herein. In some examples, the station 105 may identify time-frequency resources over which the control channel is to be transmitted and modulate a transmission over those time-frequency resources. In certain examples, aspects of the operations of block 2105 may be performed by a grant component as described with reference to FIGS. 15 through 18.

At block 2110 the base station 105 may identify a location of an excluded TTI within the plurality of aggregated TTIs. The operations of block 2110 may be performed according to the methods described herein. In some examples, the base station 105 may determine to transmit data at periodic or defined intervals, and may select a location of an excluded TTI for transporting the data (e.g., select a sync slot, a RACH slot, or the like). In certain examples, aspects of the operations of block 2110 may be performed by a location identifier as described with reference to FIGS. 15 through 18.

At block 2115 the base station 105 may communicate with the UE via the resources of the communication channel over at least a subset of the plurality of aggregated TTIs based at least in part on the grant and the location of the excluded TTI. In some examples, base station 105 may communicate by transmitting or receiving, using a transmitter or receiver, a signal using time-frequency resources associated with the communication channel. The operations of block 2115 may be performed according to the methods described herein. In some examples, the base station 105 may determine a set of aggregated TTIs corresponding to a grant and transmit at least a portion of a transport block within each TTI within the set of aggregated TTIs. In certain examples, aspects of the operations of block 2115 may be performed by a resource utilizer as described with reference to FIGS. 15 through 18.

Figure 22:
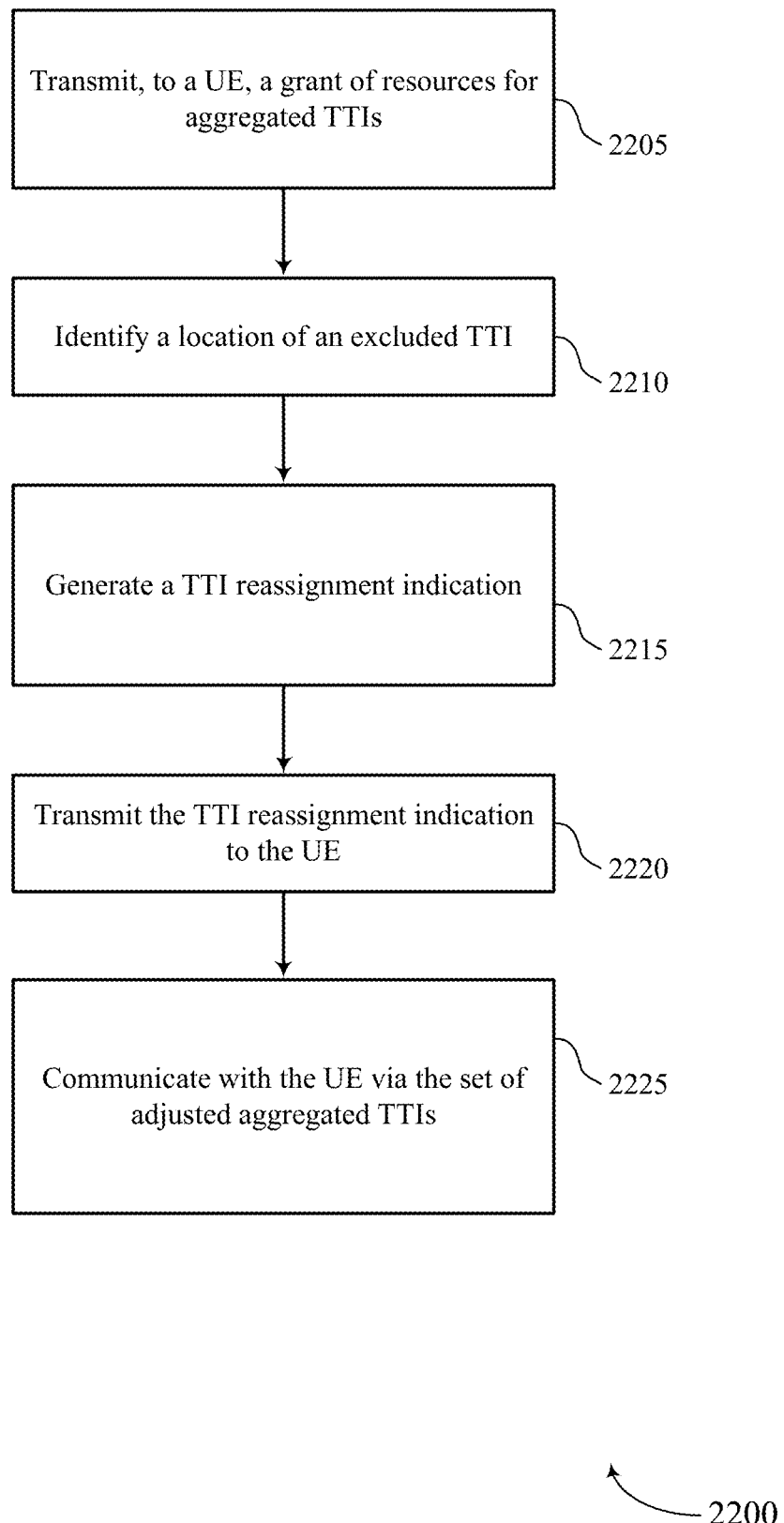

FIG. 22 shows a flowchart illustrating a method 2200 for discontinuous scheduling in accordance with aspects of the present disclosure. The operations of method 2200 may be implemented by a base station 105 or its components as described herein. For example, the operations of method 2200 may be performed by a base station communications manager as described with reference to FIGS. 15 through 18. In some examples, a base station 105 may execute a set of codes to control the functional elements of the device to perform the functions described below. Additionally or alternatively, the base station 105 may perform aspects of the functions described below using special-purpose hardware.

At block 2205 the base station 105 may transmit, to a user equipment (UE), a grant of resources of a communication channel over a plurality of aggregated transmission time intervals (TTIs). The base station may transmit the grant using a transmitter 1520, 1620, or transceiver 1835, for example. The operations of block 2205 may be performed according to the methods described herein. In some examples, the base station 105 may identify time-frequency resources over which the control channel is to be transmitted and cause transmitter 1520 or 1620 to modulate a transmission over those time-frequency resources. In certain examples, aspects of the operations of block 2205 may be performed by a grant component as described with reference to FIGS. 15 through 18.

At block 2210 the base station 105 may identify a location of an excluded TTI within the plurality of aggregated TTIs. The operations of block 2210 may be performed according to the methods described herein. In some examples, the base station 105 may determine to transmit data at periodic or defined intervals, and may select a location of an excluded TTI for transporting the data (e.g., select a sync slot, a RACH slot, or the like). In certain examples, aspects of the operations of block 2210 may be performed by a location identifier as described with reference to FIGS. 15 through 18.

At block 2215 the base station 105 may generate a TTI reassignment indication reassigning at least a portion of a first TTI of the plurality of aggregated TTIs based at least in part on determining that a capability of the UE satisfies a threshold. The operations of block 2215 may be performed according to the methods described herein. In some examples, the base station 105 may determine to transmit priority data (e.g., URLLC) in a TTI that was previously allocated to a UE 115 in a previously transmitted grant. The station 105 may generate a TTI reassignment indication to reassign the TTI. In certain examples, aspects of the operations of block 2215 may be performed by a reassigner component as described with reference to FIGS. 15 through 18.

At block 2220 the base station 105 may transmit the TTI reassignment indication to the UE. The base station 105 may transmit the TTI reassignment indication via a transmitter, for example. The operations of block 2220 may be performed according to the methods described herein. The base station 105 may encode and modulate bits for transmission to the UE 115 via a wireless communication channel. In certain examples, aspects of the operations of block 2220 may be performed by a reassigner component as described with reference to FIGS. 15 through 18.

At block 2225 the base station 105 may communicate with the UE via the resources of the communication channel over at least a subset of the adjusted plurality of aggregated TTIs based at least in part on the grant and the location of the excluded TTI. In some examples, base station 105 may communicate by transmitting or receiving, using a transmitter or receiver, a signal using time-frequency resources associated with the communication channel. The operations of block 2225 may be performed according to the methods described herein. In some examples, the base station 105 may determine a set of adjusted aggregated TTIs corresponding to a grant and a TTI reassignment indication, and transmit, via transmitter 1520, 1620, or transceiver 1835, at least a portion of a transport block within each TTI within the set of adjusted aggregated TTIs. In certain examples, aspects of the operations of block 2225 may be performed by a resource utilizer component as described with reference to FIGS. 15 through 18.

Figure 23:
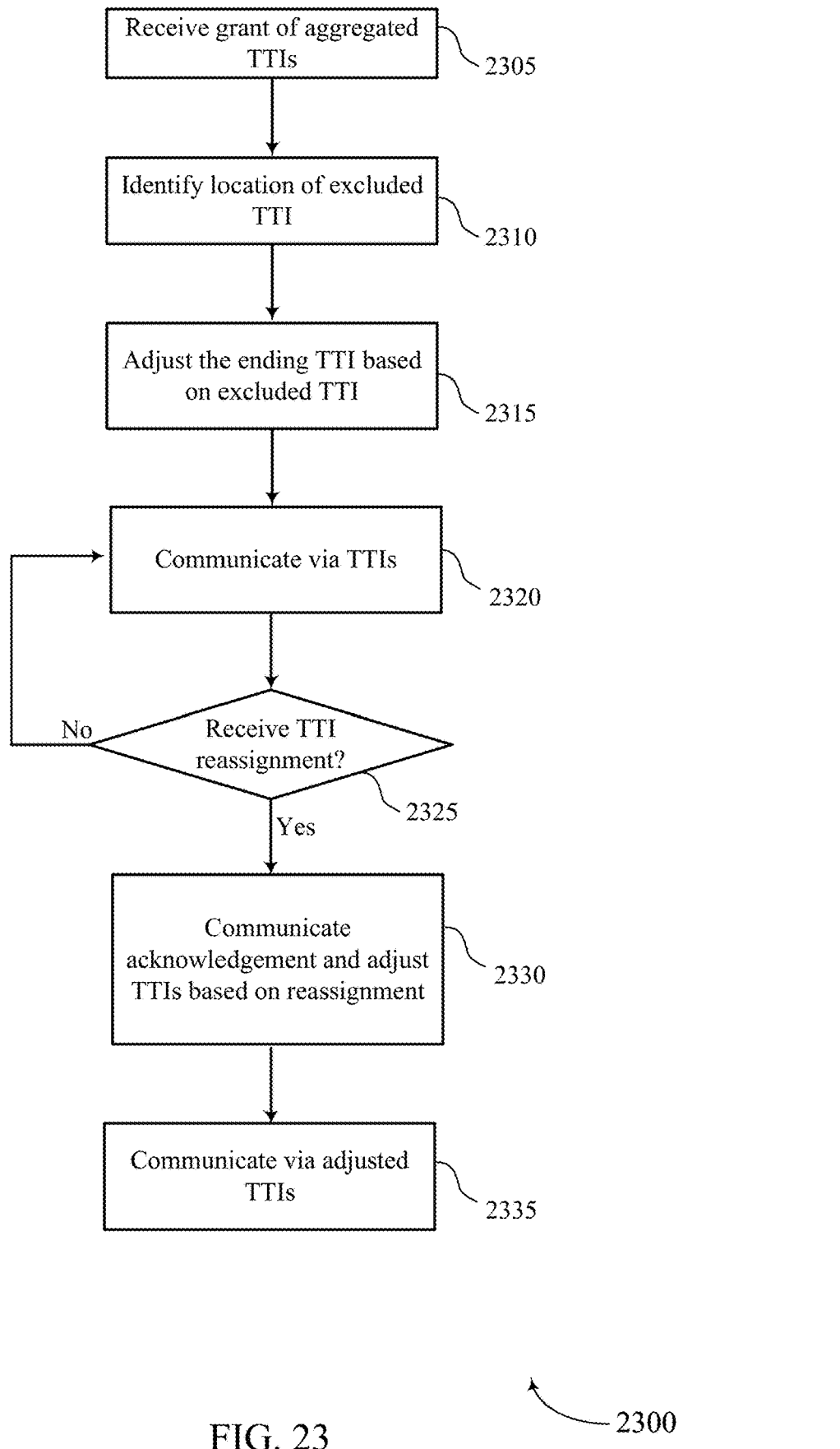

FIG. 23 shows a flowchart illustrating a method 2300 for discontinuous scheduling in accordance with aspects of the present disclosure. The operations of method 2300 may be implemented by a UE 115 or its components as described herein. For example, the operations of method 2300 may be performed by a UE communications manager as described with reference to FIGS. 11 through 14. In some examples, a UE 115 may execute a set of codes to control the functional elements of the device to perform the functions described below. Additionally or alternatively, the UE 115 may perform aspects of the functions described below using special-purpose hardware.

At block 2305, the UE 115 may receive a grant of a set of aggregated TTIs. For example, the UE 115 may receive a grant of a set of aggregated TTIs from a base station 105, via a receiver 1110 or 1210 of UE 115. The grant may include, for example, a grant of resources of a communication channel over the set of aggregated TTIs. In certain examples, aspects of the operations of block 2305 may be performed by a monitor component as described with reference to FIGS. 11 through 14.

At block 2310, the UE 115 may identify a location of an excluded TTI in the set of aggregated TTIs. In some cases, the UE 115 may identify the location of the excluded TTI. In some examples, the UE 115 may identify the location of the excluded TTI based on an indication received from the base station 105 via a configuration in a master information block, a minimum system information block (mSIB), an other SIB (OSIB), RRC messaging, group-common DCI signaling, or the like. In some cases, the periodic or known intervals of such excluded TTIs may be preconfigured and the UE 115 may know to exclude such TTIs from the set of aggregated TTIs in the grant. In other examples, the grant may provide an explicit indication that excludes such TTIs from the grant of resources. In certain examples, aspects of the operations of block 2310 may be performed by a location identifier as described with reference to FIGS. 11 through 14.

At block 2315, the UE 115 may adjust the ending TTI of the set of aggregated TTIs based on the location of the excluded TTI. In some examples, the UE 115 may determine a set of aggregated TTIs corresponding to a grant, determine a location of a TTI within the grant being reassigned, and shift the subsequent TTIs in the set of aggregated TTIs by at least one TTI. In certain examples, aspects of the operations of block 2315 may be performed by a reassigner component as described with reference to FIGS. 11 through 14.

At block 2320, the UE 115 may begin communication (e.g., with the base station 105) via the TTIs, e.g., UE 115 may begin communication via the resources of the communication channel over at least a subset of the set of aggregated TTIs, based on the grant and the identified location of the excluded TTI. In some examples, UE 115 may communicate by transmitting or receiving, using a transmitter or receiver as described in FIGS. 11-12, a signal using time-frequency resources associated with the communication channel. In certain examples, aspects of the operations of block 2320 may be performed by a resource utilizer as described with reference to FIGS. 11 through 14.

At block 2325, the UE 115 may determine if the UE 115 has received a TTI reassignment indication (e.g., from base station 105) reassigning at least a portion of a TTI of the set of aggregated TTIs.

If it is determined that the UE 115 has not received a TTI reassignment indication, the UE may return to block 2320 and continue communication over the subset of the set of aggregated TTIs.

If it is determined that the UE 115 has received a TTI reassignment indication, at block 2330, the UE may communicate, to the base station 105, an acknowledgement of the reassignment indication, and may adjust the TTIs included in the set of aggregated TTIs based on the reassignment indication.

At block 2335, the UE may communicate, with base station 105, via the adjusted TTIs, e.g., UE 115 may begin communication via the resources of the communication channel over the adjusted set of aggregated TTIs. In some examples, UE 115 may communicate by transmitting or receiving, using a transmitter or receiver as described in FIGS. 11-12, a signal using time-frequency resources associated with the communication channel using the adjusted set of aggregated TTIs. In certain examples, aspects of the operations of block 2335 may be performed by a resource utilizer as described with reference to FIGS. 11 through 14.

It should be noted that the methods described above describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. The terms "system" and "network" are often used interchangeably. A code division multiple access (CDMA) system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE and LTE-A are releases of UMTS that use E-UTRA. UTRA, E-UTRA, UMTS, LTE, LTE-A, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE or an NR system may be described for purposes of example, and LTE or NR terminology may be used in much of the description, the techniques described herein are applicable beyond LTE or NR applications.

In LTE/LTE-A networks, including such networks described herein, the term evolved node B (eNB) may be generally used to describe the base stations. The wireless communications system or systems described herein may include a heterogeneous LTE/LTE-A or NR network in which different types of eNBs provide coverage for various geographical regions. For example, each eNB, next generation NodeB (gNB), or base station may provide communication coverage for a macro cell, a small cell, or other types of cell. The term "cell" may be used to describe a base station, a carrier or component carrier associated with a base station, or a coverage area (e.g., sector, etc.) of a carrier or base station, depending on context.

Base stations may include or may be referred to by those skilled in the art as a base transceiver station, a radio base station, an access point, a radio transceiver, a NodeB, eNodeB (eNB), gNB, Home NodeB, a Home eNodeB, or some other suitable terminology. The geographic coverage area for a base station may be divided into sectors making up only a portion of the coverage area. The wireless communications system or systems described herein may include base stations of different types (e.g., macro or small cell base stations). The UEs described herein may be able to communicate with various types of base stations and network equipment including macro eNBs, small cell eNBs, gNBs, relay base stations, and the like. There may be overlapping geographic coverage areas for different technologies.

A macro cell generally covers a relatively large geographic area (e.g., several kilometers in radius) and may allow unrestricted access by UEs with service subscriptions with the network provider. A small cell is a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers).

The wireless communications system or systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The downlink transmissions described herein may also be called forward link transmissions while the uplink transmissions may also be called reverse link transmissions. Each communication link described herein—including, for example, wireless communications system 100 and 200 of FIGS. 1 and 2—may include one or more carriers, where each carrier may be a signal made up of multiple sub-carriers (e.g., waveform signals of different frequencies).

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication, comprising:
monitoring a control channel for a grant of resources of a communication channel;
receiving, from a base station, a reassignment indicator associated with the communication channel;
identifying a location of an excluded portion within the resources based at least in part on the reassignment indicator; and
refraining from communicating with the base station on the excluded portion of the resources of the communication channel based at least in part on the grant and the identified location of the excluded portion.

2. The method of claim 1, further comprising:
communicating with the base station via the communication channel over at least a subset of the resources based at least in part on the grant and the identified location of the excluded portion.

3. The method of claim 2, wherein communicating via the communication channel comprises:
transmitting a first portion of a transmission in a first symbol of a plurality of symbols associated with the resources and a second portion of the transmission in a second symbol of the plurality of symbols.

4. The method of claim 3, further comprising:
identifying the first symbol of the plurality of symbols associated with the resources to be transmitted via a first transmit beam and the second symbol of the plurality of symbols to be transmitted via a second transmit beam.

5. The method of claim 1, wherein the reassignment indicator indicates the excluded portion within the resources.

6. The method of claim 1, wherein the reassignment indicator is received via downlink control information (DCI).

7. The method of claim 6, wherein the DCI includes an explicit indication of the excluded portion.

8. The method of claim 1, wherein the reassignment indicator is received via radio resource control (RRC) signaling.

9. The method of claim 1, wherein the reassignment indicator includes information corresponding to one or more capabilities of a user equipment (UE) receiving the reassignment indicator.

10. The method of claim 1, further comprising:
determining that the reassignment indicator is received after a beginning of a transmission scheduled by the grant; and
cancelling a remainder of the transmission.

11. The method of claim 1, wherein the resources comprise a plurality of aggregated transmission time intervals (TTIs).

12. The method of claim 11, further comprising:
adjusting a TTI number for the plurality of aggregated TTIs based at least in part on the location of the excluded portion.

13. The method of claim 1, further comprising:
determining that the excluded portion of the resources is being punctured by a transmission.

14. The method of claim 1, further comprising:
communicating an acknowledgment of the reassignment indicator prior to a beginning of the resources.

15. The method of claim 1, wherein the excluded portion comprises one or more symbols of the resources.

16. The method of claim 1, wherein the grant comprises at least one of a starting indication, an ending indication, or a transmission time interval (TTI) number indication.

17. A method for wireless communication at a base station, comprising:
transmitting, from the base station and to a user equipment (UE), a grant of resources of a communication channel;
transmitting, from the base station to the UE, a reassignment indicator associated with the communication channel;
identifying a location of an excluded portion within the resources based at least in part on the reassignment indicator; and
refraining from communicating with the UE on the excluded portion of the resources of the communication channel based at least in part on the grant and the identified location of the excluded portion.

18. The method of claim 17, further comprising:
communicating with the UE via the communication channel over at least a subset of the resources based at least in part on the grant and the identified location of the excluded portion.

19. An apparatus for wireless communication, comprising:
a processor;
memory coupled with the processor; and
instructions stored in the memory and operable, when executed by the processor, to cause the apparatus to:
monitor a control channel for a grant of resources of a communication channel;
receive, from a base station, a reassignment indicator associated with the communication channel;
identify a location of an excluded portion within the resources based at least in part on the reassignment indicator; and
refrain from communicating with the base station on the excluded portion of the resources of the communication channel based at least in part on the grant and the identified location of the excluded portion.

20. The apparatus of claim 19, wherein the instructions are further executable by the processor to:
communicate with the base station via the communication channel over at least a subset of the resources based at least in part on the grant and the identified location of the excluded portion.

21. The apparatus of claim 20, wherein the instructions to communicate via the communication channel comprise instructions further executable by the processor to:
transmit a first portion of a transmission in a first symbol of a plurality of symbols associated with the resources and a second portion of the transmission in a second symbol of the plurality of symbols.

22. The apparatus of claim 21, wherein the instructions are further executable by the processor to:
identify the first symbol of the plurality of symbols associated with the resources to be transmitted via a first transmit beam and the second symbol of the plurality of symbols to be transmitted via a second transmit beam.

23. The apparatus of claim 19, wherein the reassignment indicator indicates the excluded portion within the resources.

24. The apparatus of claim 19, wherein the reassignment indicator is received via downlink control information (DCI).

25. The apparatus of claim 24, wherein the DCI includes an explicit indication of the excluded portion.

26. The apparatus of claim 19, wherein the reassignment indicator is received via radio resource control (RRC) signaling.

27. The apparatus of claim 19, wherein the reassignment indicator includes information corresponding to one or more capabilities of a user equipment (UE) receiving the reassignment indicator.

28. The apparatus of claim 19, wherein the instructions are further executable by the processor to:
determine that the reassignment indicator is received after a beginning a transmission scheduled by the grant; and
cancel a remainder of the transmission.

29. The apparatus of claim 19, wherein the resources comprise a plurality of aggregated transmission time intervals (TTIs).

30. The apparatus of claim 29, wherein the instructions are further executable by the processor to:
adjust a TTI number for the plurality of aggregated TTIs based at least in part on the location of the excluded portion.

31. The apparatus of claim 19, wherein the instructions are further executable by the processor to:
determine that the excluded portion of the resources is being punctured by a transmission.

32. The apparatus of claim 19, wherein the instructions are further executable by the processor to:
communicate an acknowledgment of the reassignment indicator prior to a beginning the resources.

33. The apparatus of claim 19, wherein the excluded portion comprises one or more symbols of the resources.

34. The apparatus of claim 19, wherein the grant comprises at least one of a starting indication, an ending indication, or a transmission time interval (TTI) number.

35. An apparatus for wireless communication at a base station, comprising:
- a processor;
- memory coupled with the processor; and
- instructions stored in the memory and operable, when executed by the processor, to cause the apparatus to:
  - transmit, from the base station and to a user equipment (UE), a grant of resources of a communication channel;
  - transmit, from the base station to the UE, a reassignment indicator associated with the communication channel;
  - identify a location of an excluded portion within the resources based at least in part on the reassignment indicator; and
  - refrain from communicating with the UE on the excluded portion of the resources of the communication channel based at least in part on the grant and the identified location of the excluded portion.

36. The apparatus of claim 35, wherein the instructions are further executable by the processor to:
- communicate with the UE via the communication channel over at least a subset of the resources based at least in part on the grant and the identified location of the excluded portion.

* * * * *